(12) United States Patent
Yabuta et al.

(10) Patent No.: US 11,447,003 B2
(45) Date of Patent: Sep. 20, 2022

(54) VEHICLE POWER DEVICE AND WHEEL BEARING DEVICE WITH GENERATOR

(71) Applicant: NTN CORPORATION, Osaka (JP)

(72) Inventors: Hiroki Yabuta, Iwata (JP); Kentaro Nishikawa, Iwata (JP); Mitsuo Kawamura, Iwata (JP); Yasuyuki Fujita, Iwata (JP); Yuuji Yada, Iwata (JP)

(73) Assignee: NTN CORPORATION, Osaka (JP)

( * ) Notice: Subject to any disclaimer, the term of this patent is extended or adjusted under 35 U.S.C. 154(b) by 230 days.

(21) Appl. No.: 16/850,576

(22) Filed: Apr. 16, 2020

(65) Prior Publication Data
US 2020/0238817 A1    Jul. 30, 2020

Related U.S. Application Data

(63) Continuation of application No. PCT/JP2018/038534, filed on Oct. 16, 2018.

(30) Foreign Application Priority Data

Oct. 17, 2017  (JP) .............................. JP2017-200780
Sep. 5, 2018   (JP) .............................. JP2018-165590

(51) Int. Cl.
*B60K 7/00*     (2006.01)
*B60B 27/00*    (2006.01)
(Continued)

(52) U.S. Cl.
CPC ........ *B60K 7/0007* (2013.01); *B60B 27/0052* (2013.01); *B60B 27/0063* (2013.01);
(Continued)

(58) Field of Classification Search
CPC .......................... B60K 7/0007; B60B 27/0052
See application file for complete search history.

(56) References Cited

U.S. PATENT DOCUMENTS

2009/0236157 A1* 9/2009 Akamatsu ............ B60K 17/046
                                                    180/55
2012/0229004 A1* 9/2012 Takahashi ............ B60K 7/0007
                                                    310/67 R
(Continued)

FOREIGN PATENT DOCUMENTS

DE          20306902 U       10/2004
EP          0492290          7/1992
(Continued)

OTHER PUBLICATIONS

International Preliminary Report on Patentability dated Apr. 30, 2020 in corresponding International Patent Application No. PCT/JP2018/038534 (8 pages).
(Continued)

*Primary Examiner* — Brian L Swenson

(57) ABSTRACT

The vehicle power device includes: a wheel bearing including a stationary ring and a rotary ring; and a motor including a stator and a rotor. The stator and the rotor of the motor generator have a smaller diameter than that of an outer peripheral part of the brake rotor, and an entirety of the motor, excluding a mounting part to the hub flange, is located within an axial range between the hub flange and an outboard-side surface of a chassis frame component. An insulating layer is interposed between the stationary ring and the stator.

9 Claims, 14 Drawing Sheets

(51) Int. Cl.
   *H02K 7/00*   (2006.01)
   *H02K 7/102*  (2006.01)
   *H02K 21/22*  (2006.01)
   *B60K 6/26*   (2007.10)

(52) U.S. Cl.
   CPC ............ *H02K 7/006* (2013.01); *H02K 7/102* (2013.01); *H02K 21/22* (2013.01); *B60K 6/26* (2013.01); *B60Y 2200/92* (2013.01)

(56) References Cited

U.S. PATENT DOCUMENTS

| | | | |
|---|---|---|---|
| 2012/0256472 A1* | 10/2012 | Takahashi | B60L 3/0061 301/6.5 |
| 2012/0286608 A1* | 11/2012 | Komiyama | F16C 33/6633 310/90 |
| 2013/0009450 A1* | 1/2013 | Suzuki | H02K 7/116 301/6.5 |
| 2013/0320747 A1* | 12/2013 | Ozaki | B60L 3/0061 301/6.5 |
| 2014/0117743 A1 | 5/2014 | Vogler et al. | |
| 2015/0204399 A1* | 7/2015 | Schmidt | F16D 49/00 188/161 |
| 2015/0231959 A1* | 8/2015 | Ishikawa | B60K 17/145 301/6.5 |
| 2017/0110933 A1* | 4/2017 | Michel | B60K 7/0007 |
| 2017/0113536 A1* | 4/2017 | Takehana | B60K 17/145 |
| 2017/0155305 A1* | 6/2017 | Takayama | H02K 5/1737 |
| 2017/0324297 A1* | 11/2017 | Furuuchi | H02K 9/02 |
| 2020/0112229 A1 | 4/2020 | Yabuta | |

FOREIGN PATENT DOCUMENTS

| | | |
|---|---|---|
| JP | 2003-219598 A | 7/2003 |
| JP | 2007-016846 | 1/2007 |
| JP | 2007-153266 | 6/2007 |
| JP | 2007-162923 | 6/2007 |
| JP | 2008-307917 A | 12/2008 |
| JP | 5402619 | 1/2014 |
| JP | 2014-075879 A | 4/2014 |
| JP | 2018-204754 | 12/2018 |

OTHER PUBLICATIONS

Extended and Supplementary Search Report dated Jun. 11, 2021 in corresponding European patent application No. 18868945.9.
International Search Report dated Dec. 25, 2018 in corresponding International Patent Application No. PCT/JP2018/038534.
Japanese Office Action dated May 17, 2022 in Japanese Patent Application No. 2018-165590 (4 pages; 3 pages English translation).

* cited by examiner

VEHICLE POWER DEVICE AND WHEEL BEARING DEVICE WITH GENERATOR

CROSS REFERENCE TO THE RELATED APPLICATION

This application is a continuation application, under 35 U.S.C. § 111(a), of international application No. PCT/JP2018/038534, filed Oct. 16, 2018, which claims priority to Japanese patent application No. 2017-200780, filed Oct. 17, 2017 and Japanese patent application No. 2018-165590, filed Sep. 5, 2018, the entire disclosures of all of which are herein incorporated by reference as a part of this application.

BACKGROUND OF THE INVENTION

Field of the Invention

The present invention relates to a vehicle power device including a wheel bearing and a generator as well as to a wheel bearing device with a generator. The present invention also relates to a technique for eliminating a potential difference between inner and outer rings of a bearing due to installation of a generator in order to prevent electrolytic corrosion of the bearing.

Description of Related Art

In a wheel bearing including a rotor and a stator, when a spark occurs between a rolling element and a raceway surface of a bearing due to a potential difference between a stationary ring and a hub flange, the spark causes the rolling element and the rolling surface of the bearing to melt, resulting in a pearskin-like or corrugated electrolytic corrosion. Such electrolytic corrosion may lead to abnormal noise from the bearing or shortened service life of the bearing.

A technique has been proposed for preventing electrolytic corrosion of a rolling bearing part in a wheel drive device that includes a motor as a driving source (Patent Document 1). In a wheel drive device having a motor of an inner rotor type as a driving source, this technique prevents electrolytic corrosion of a rolling bearing part of a wheel bearing by pressing a conical surface or a spherical contact body electrically connected to a stator against a rotor so as to provide electrical conduction between the rotor and the stator.

As shown in FIG. 15, the applicant of the present application has proposed a technique of providing, in a wheel structure including a motor of an outer rotor type disposed between a wheel bearing and a brake rotor, conducting brushes Br between a stationary ring and a hub flange of the wheel bearing (Japanese patent application No. 2017-113246). The conducting brushes Br allow current to flow where a potential difference is generated between the inner and outer rings of the wheel bearing, so as to eliminate the potential difference between the rotor and the stator, prevent current flow between the hub flange and the stationary ring through the rolling element(s) 60, and thereby prevent electrolytic corrosion of the bearing.

Related Document

Patent Document

[Patent Document 1] JP Patent No. 5402619

SUMMARY OF THE INVENTION

The configuration described in Patent Document 1 is applicable only to a vehicle drive device that includes a motor of an inner rotor type as a driving source. In addition, an electrolytic corrosion prevention unit for pressing a contact body against a rotor includes a large number of components, resulting in a complicated structure and high manufacturing costs. Thus, the configuration shown in FIG. 15 includes conducting brushes Br provided between a stationary ring and a hub flange of a wheel bearing in order to make it applicable to a vehicle drive device that includes a motor of an outer rotor type as a driving source. In this case, the conducting brushes Br conduct electric current where a potential difference is generated between inner and outer rings of the wheel bearing so as to eliminate the potential difference and thereby prevent electrolytic corrosion caused by a spark at a rolling element 60. The conical surface or spherical contact body or the conducting brushes Br, however, needs to be regularly replaced because their current conduction performance would be deteriorated due to friction caused by continuous sliding during rotation of the wheel bearing.

An object of the present invention is to provide a vehicle power device and a wheel bearing device with a generator that are capable of preventing electrolytic corrosion of a wheel bearing and eliminating necessity to perform maintenance for an insulating function.

A vehicle power device according to a first configuration of the present invention includes:

a wheel bearing including a stationary ring and a rotary ring having a hub flange, the rotary ring being rotatably supported by the stationary ring via rolling elements, the hub flange being configured to be attached with a wheel of a vehicle and a brake rotor, and a motor including a stator attached to the stationary ring of the wheel bearing and a rotor attached to the rotary ring of the wheel bearing, wherein all or a part of the stator and the rotor has a smaller diameter than that of an outer peripheral part of the brake rotor, against which a brake caliper is pressed, and an entirety of the motor, excluding a mounting part to the hub flange, is located within an axial range between the hub flange and an outboard-side surface of a chassis frame component of the vehicle, and an insulating layer is interposed between the stationary ring and the stator.

According to this configuration, since it is of a direct drive type in which the rotor of the motor is attached to the rotary ring of the wheel bearing, the vehicle power device as a whole can have a smaller number of components and a simple and space-saving configuration, and it is thus possible to suppress increase in the vehicle weight.

All or a part of the stator and the rotor has a smaller diameter than that of the outer peripheral part of the brake rotor, and the entirety of the motor, excluding its mounting part to the hub flange, is located within the axial range between the hub flange and the outboard-side surface of the chassis frame component. Therefore, it is possible to secure a space for installing the motor inside the brake rotor to compactly accommodate the motor.

Since an electrolytic corrosion prevention unit or the like having a conventional structure includes a large number of components, it is difficult to secure a space for installing the electrolytic corrosion prevention unit in the vehicle power device that accommodates all the components inside the brake rotor. Such a vehicle power device that accommodates all the components inside the brake rotor especially requires a more compact insulating structure than that of a common in-wheel motor. According to this configuration, it is possible to make use of a small annular space between the stationary ring and the stator and interpose the insulating layer in the annular space so that the insulating layer blocks current flow to the rolling elements without increasing the diameter of the vehicle power device as a whole (i.e., without preventing the components of the vehicle power device from being accommodated inside the brake rotor).

As a measure against electrolytic corrosion, this configuration provides the following advantages over the configuration in which conducting brushes are used.

(1) Inspection can be easily made to ensure the measure against electrolytic corrosion.

This is because in an assembled state of the vehicle power device, the technique of providing the conducting brushes does not make it possible to check if the conducting brushes conduct current between the inner and outer rings of the bearing, only by measuring electrical resistance between the inner and outer rings of the bearing. In contrast, in the configuration of the present invention in which the insulating layer is interposed between the stationary ring and the stator, electrolytic corrosion cannot occur as long as insulation is provided, which is determined by measurement of electrical resistance between the stator and the stationary ring or between the stator and the rotary ring.

(2) The insulating layer does not require replacement because it does not wear like the conducting brushes, which leads to a cost reduction. This is because the insulating layer does not degrade over time during operation, since the insulating layer is not subjected to sliding.

As described above, since the insulating layer is interposed between the stationary ring and the stator so that the insulating layer blocks current flow to the rolling elements, it is possible to prevent electrolytic corrosion of the wheel bearing. Prevention of electrolytic corrosion of the wheel bearing may make it possible to prevent abnormality in the rolling elements and the rolling surfaces of the wheel bearing, extend the service life of the wheel bearing, and prevent noise from the wheel bearing in advance. Since the insulating layer does not require replacement because it does not wear like the conducting brushes etc., there is no need to perform maintenance for the insulating function. Therefore, it is possible to reduce costs, in comparison with a conventional example with conducting brushes or the like.

The motor may be of an outer rotor type in which the stator is located on an outer periphery side of the wheel bearing, and the rotor is located radially outside the stator. In such a case, it is possible to increase an area in which the rotor and the stator are opposed, in comparison with that in the motor of inner rotor type. This makes it possible to maximize an output torque in a limited space.

The motor may be a motor generator capable of rotationally driving the wheel. Where the vehicle power device with the motor generator is installed in a vehicle mounted with, e.g., a conventional internal combustion engine, it is possible to reduce fuel consumption by power assistance provided by the motor generator. In a configuration of a conventional example having a speed reduction mechanism, it is not necessary to mount a motor generator around a wheel bearing, and thus it is possible to provide a configuration in which no potential difference is generated between inner and outer rings of the bearing. Where the stator and the rotor of the motor generator are disposed between the inner and outer rings of the bearing, a potential difference is generated between the inner and outer rings of the bearing. Therefore, the present invention is limited to the configuration in which a motor generator of a direct drive type is installed in a wheel bearing.

The motor may have a drive voltage for rotationally driving or a regeneration voltage of 60 V or lower. In such a case, a so-called intermediate voltage battery may be mounted in the vehicle, the battery having a voltage lower than that of a high voltage battery which is used for, e.g., a so-called strong hybrid vehicle and has a voltage of 100 V or higher, the voltage having a negligible influence to a human body when an electric shock occurs during operation. This makes it possible to, for example, convert a vehicle only having an internal combustion engine into a mild hybrid vehicle, without significant modifications of the vehicle.

The vehicle power device may include an intermediate member between the stationary ring and the stator, the intermediate member being configured to fix the stationary ring to the chassis frame component, wherein the insulating layer may be provided one or both of between the intermediate member and the stationary ring and between the intermediate member and the stator. Where the insulating layer is provided between the intermediate member and the stator, the insulating layer may be made of a soft material (e.g., such as a resin material and a rubber material). The reason is that the insulating layer is not required to have such a high strength because the only force that acts between the intermediate member and the stator is a force generated by the generator. Where the insulating layer is provided between the intermediate member and the stationary ring, the insulating layer requires a rigid insulating material between the intermediate member and the stationary ring. This is because a force generated by a vehicle weight and a vehicle movement acts between the intermediate member and the stationary ring.

The vehicle power device may include an intermediate member between the stationary ring and the stator, the intermediate member being configured to fix the stationary ring to the chassis frame component, wherein the intermediate member is made of an insulating material. In such a case, it is possible to reduce the number of components and thereby to simplify the structure, in comparison with the case where a member made of an insulating material is provided in addition to the intermediate member.

In the first configuration, the vehicle power device may include an insulating member between the rotor and the rotary ring. In addition to the above-described possible current flow to the rolling element(s) due to the potential difference between the inner and outer rings of the bearing, there is a possibility that current may flow from the rotor to the rolling element(s) through the rotary ring due to generation of weak eddy current between the rotor and the stator of the motor. According to this configuration, the insulating member is provided between the rotor and the rotary ring, besides the insulating layer interposed between the stationary ring and the stator, so that insulation is provided between the rotor and the rotary ring in order to more reliably prevent electrolytic corrosion of the rolling elements.

A vehicle power device according to a second invention of the present invention includes:

a wheel bearing including a stationary ring and a rotary ring having a hub flange, the rotary ring being rotatably supported by the stationary ring via rolling elements, the hub flange being configured to be attached with a wheel of a vehicle and a brake rotor; and a motor including a stator attached to the stationary ring of the wheel bearing and a rotor attached to the rotary ring of the wheel bearing, wherein all or a part of the stator and the rotor has a smaller diameter than that of an outer peripheral part of the brake rotor, against which a brake caliper is pressed, and an entirety of the motor, excluding a mounting part to the hub flange, is located within an axial range between the hub flange and an outboard-side surface of a chassis frame component of the vehicle, and the rolling elements are made of an insulating material.

According to this configuration, since the rolling elements are made of the insulating material, current flow to the rolling elements can be blocked so as to prevent electrolytic corrosion of the wheel bearing. Prevention of electrolytic corrosion of the wheel bearing may makes it possible to prevent abnormality in the rolling elements and the rolling surfaces of the wheel bearing and to extend the service life of the wheel bearing. Since the rolling elements made of the insulating material do not require replacement because they do not wear like the conducting brushes etc., there is no need to perform maintenance for the insulating function. Therefore, it is possible to reduce costs, in comparison with a conventional example with conducting brushes etc.

A wheel bearing device with a generator according to the present invention includes:

a wheel bearing including a stationary ring and a rotary ring having a hub flange, the rotary ring being rotatably supported by the stationary ring via rolling elements, the hub flange being configured to be attached with a wheel of a vehicle and a brake rotor, and a generator including a stator attached to the stationary ring of the wheel bearing and a rotor attached to the rotary ring of the wheel bearing, wherein all or a part of the stator and the rotor has a smaller diameter than that of an outer peripheral part of the brake rotor, against which a brake caliper is pressed, and an entirety of the generator, excluding a mounting part to the hub flange, is located within an axial range between the hub flange and an outboard-side surface of a chassis frame component of the vehicle, and an insulating layer is interposed between the stationary ring and the stator.

According to this configuration, it is possible to make use of a small annular space between the stationary ring and the stator and interpose the insulating layer in the annular space so that the insulating layer blocks current flow to the rolling elements without increasing the diameter of the vehicle power device with the generator as a whole (i.e., without preventing the components of the vehicle power device with the generator from being accommodated inside the brake rotor). This makes it possible to prevent electrolytic corrosion of the wheel bearing. Otherwise, this configuration provides the same effects and advantages as those of the vehicle power device of the first configuration.

The vehicle power device may include an insulating member between the rotor and the rotary ring. In addition to the above-described possible current flow to the rolling element(s) due to the potential difference between the inner and outer rings of the bearing, there is a possibility that current may flow from the rotor to the rolling element(s) through the rotary ring due to generation of weak eddy current between the rotor and the stator of the generator. According to this configuration, the insulating member is provided between the rotor and the rotary ring, besides the insulating layer interposed between the stationary ring and the stator, so that insulation is provided between the rotor and the rotary ring in order to more reliably prevent electrolytic corrosion of the rolling elements.

Any combination of at least two constructions disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
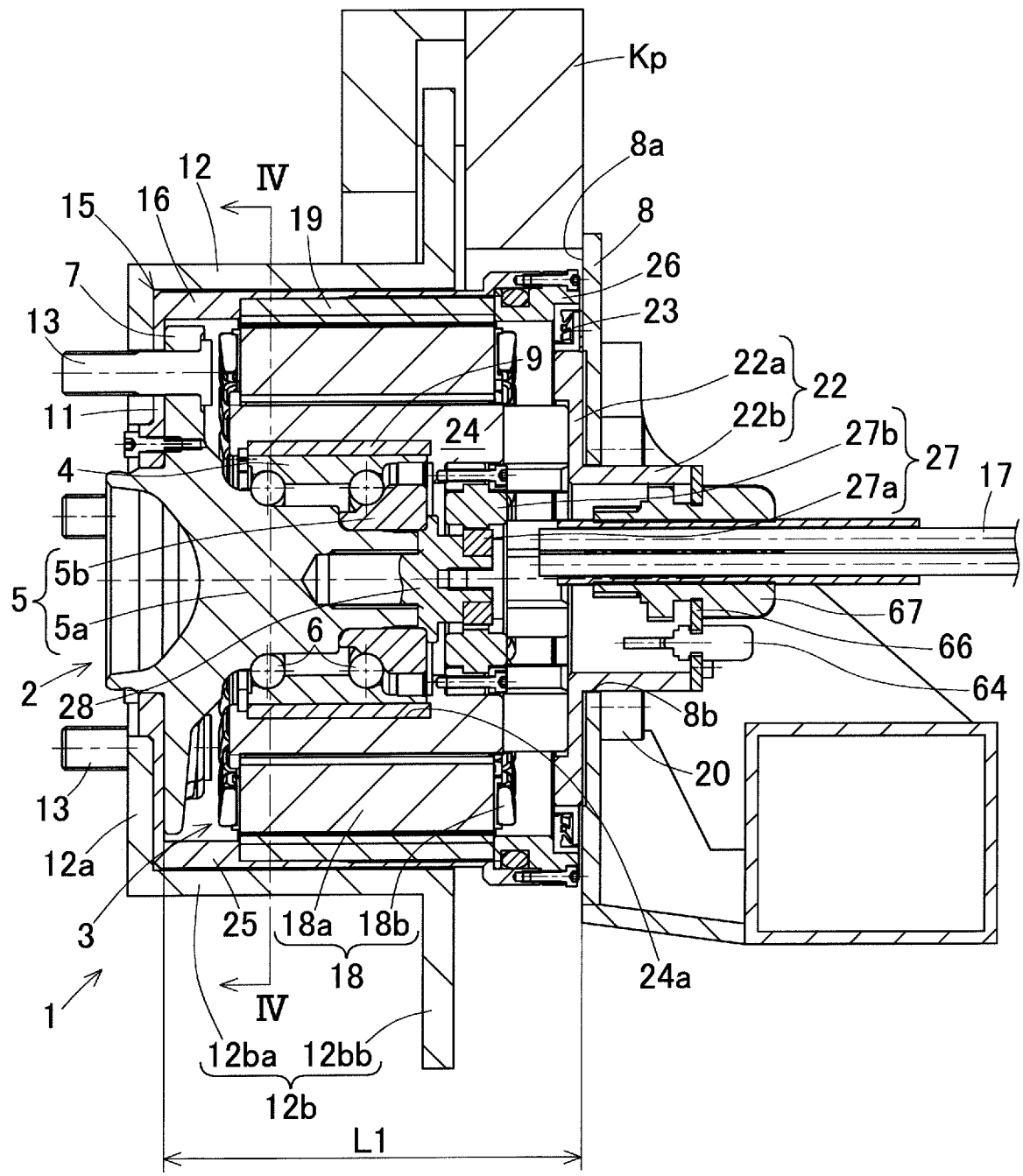
FIG. 1 is a sectional view of a vehicle power device (a wheel bearing device with a generator) according to an embodiment of the present invention.

A vehicle power device according to an embodiment of the present invention will be described with reference to FIG. 1 to FIG. 5. As shown in FIG. 1, the vehicle power device 1 includes a wheel bearing 2 and a motor generator 3, i.e., a generator that also serves as a motor. It should be noted that the wheel bearing device with a generator according to an embodiment of the present invention may include the vehicle power device 1 having a generator that does not serve as a motor, instead of the motor generator 3. That is, the wheel bearing device with the generator includes a generator 3 that does not serve as a motor and a wheel bearing 2. The wheel bearing device with the generator has the same configuration as that of the vehicle power device 1, except for the motor generator 3 that also serves as a motor.

Wheel Bearing 2

The wheel bearing 2 includes an outer ring 4 as a stationary ring, double-row rolling elements 6, and an inner ring 5 as a rotary ring. The outer ring 4 rotatably supports the inner ring 5 via the double-row rolling elements 6. Grease fills a bearing space between the outer ring 4 and the inner ring 5. The inner ring 5 includes a hub axle 5a and a partial inner ring 5b fitted to an outer peripheral surface of the hub axle 5a on an inboard side. The hub axle 5a includes a hub flange 7 at a portion axially protruding toward an outboard side with respect to the outer ring 4.

The hub flange 7 has a side surface on the outboard side to which a rim (not illustrated) of a wheel, a brake rotor 12, and a casing bottom part 11 (which will be described later) are attached by hub bolts 13 in an overlapping manner in an axial direction. The rim has an outer periphery to which a non-illustrated tire is attached. It should be noted that in this specification, the term "outboard side" refers to a side closer to outside in a widthwise direction of a vehicle in a state where the vehicle power device is mounted in the vehicle, and the term "inboard side" refers to a side closer to the center in the widthwise direction of the vehicle.

Brake

Figure 2:
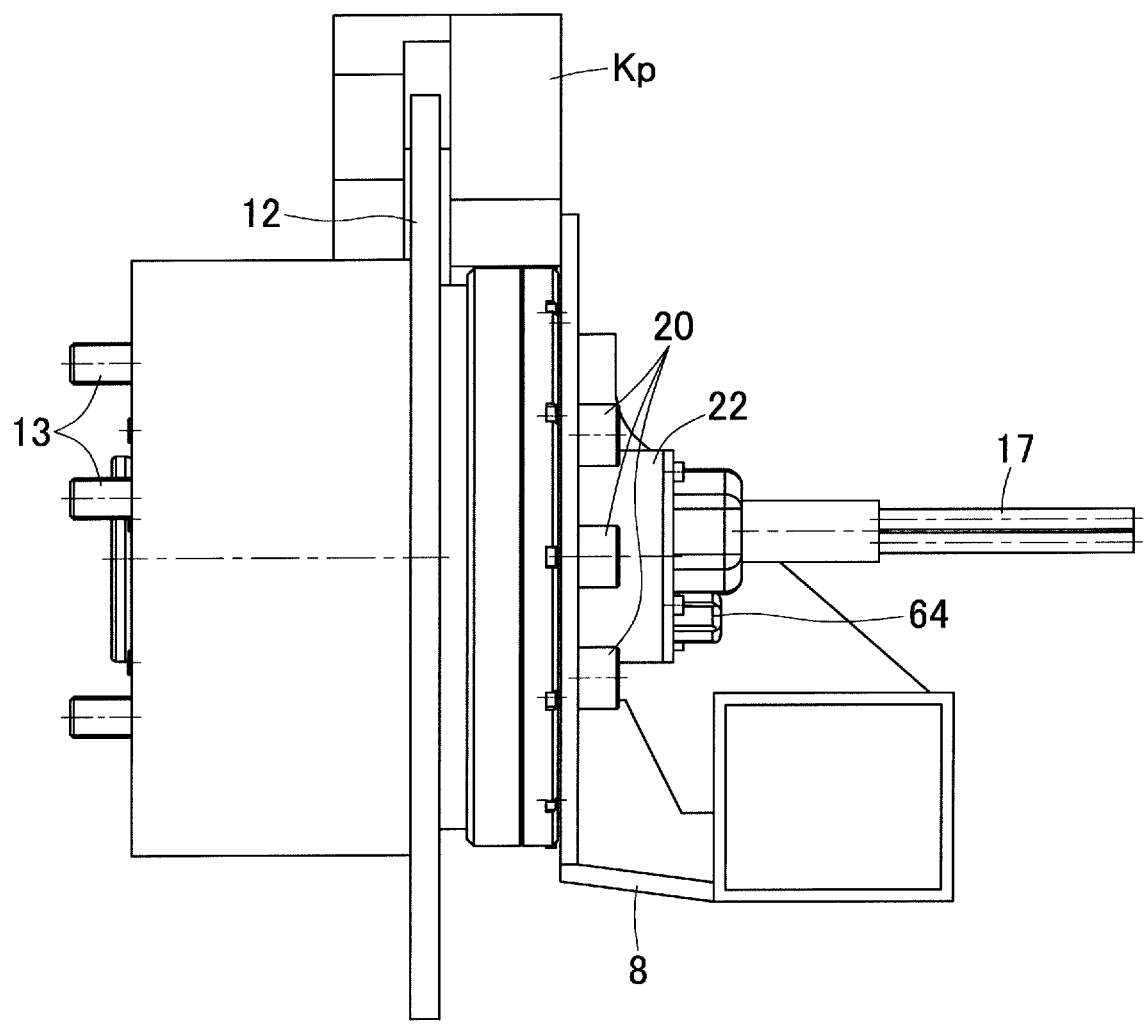
FIG. 2 is a side view of the vehicle power device.
Figure 3:
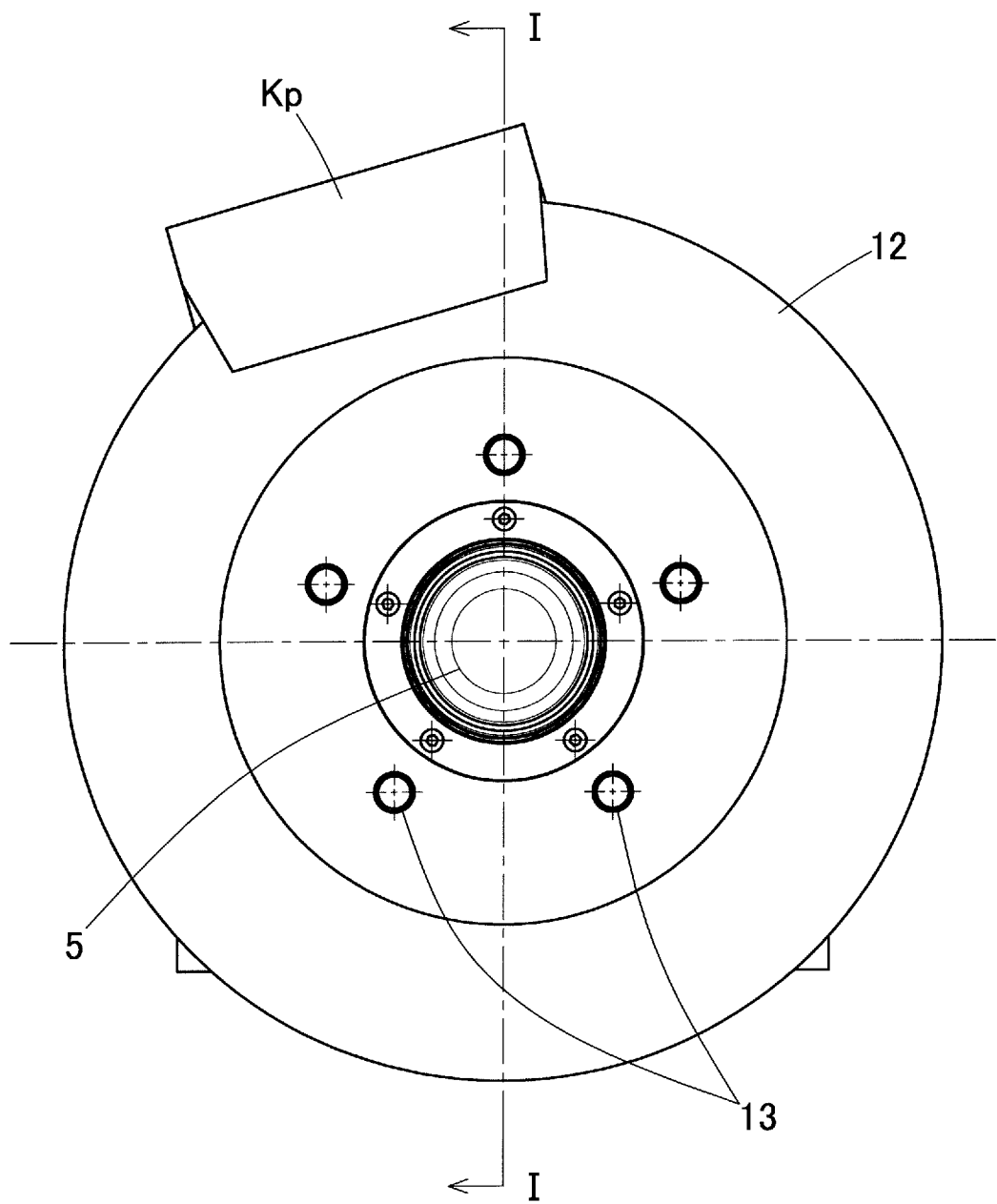
FIG. 3 is a front view of the vehicle power device.

As shown in FIG. 2 and FIG. 3, the brake is a friction brake including a brake rotor 12 of a disk type and a brake caliper Kp. FIG. 1 is a sectional view along line I-I in FIG. 3. As shown in FIG. 1, the brake rotor 12 includes a plate-like part 12a and an outer peripheral part 12b. The plate-like part 12a is an annular plate-like member that overlaps with the hub flange 7 via a casing bottom part 11. The outer peripheral part 12b extends from the plate-like part 12a toward an outer peripheral side of the outer ring 4. The outer peripheral part 12b includes: a cylindrical portion 12ba that extends from an outer peripheral edge portion of the plate-like part 12a toward the inboard side in a cylindrical manner; and a plate portion 12bb that extends from an inboard-side end of the cylindrical portion 12ba toward an outer diameter side in a plate-like manner.

The brake caliper Kp includes friction pads configured to be pressed against the plate portion 12bb of the brake rotor 12 from both sides. The brake caliper Kp is mounted to a knuckle 8 that is the chassis frame component of the vehicle. The brake caliper Kp may be any of a hydraulic type, a mechanical type, and an electric motor type.

Motor Generator 3

The motor generator 3 of this example is a motor generator (motor) for travel assisting that can generate power from rotation of a wheel and be supplied with the power to rotationally drive the wheel. Hereinafter, the motor generator 3 may also be referred to as a motor 3. The motor generator 3 includes a rotary casing 15, a stator 18, and a rotor 19. The rotary casing 15 is attached to the hub flange 7 and covers the rotor 19 and the stator 18. The motor generator 3 is of an outer rotor type in which the rotor 19 is located radially outside the stator 18. Also, it is of a direct drive type in which the rotor 19 of the motor generator 3 is mounted to the inner ring 5 that is the rotary ring of the wheel bearing 2.

In the motor generator 3, all of the stator 18 and the rotor 19 have a smaller diameter than that of the outer peripheral part 12b of the brake rotor 12. Further, the entirety of the motor generator 3, excluding its mounting part to the hub flange 7, is located within an axial range L1 between the hub flange 7 and an outboard-side surface 8a of the knuckle 8.

The motor generator 3 is an IPM (Interior Permanent Magnet) synchronous motor (or also denoted as an IPMSM (Interior Permanent Magnet Synchronous Motor)) of an outer rotor type. Alternatively, the motor generator 3 may be an SPM synchronous motor. The motor generator 3 may also be different types of motors, such as a switched reluctance motor (abbreviated as an SR motor) and an induction motor (abbreviated as an IM). In these motor types, the stator 18 may have any winding form, such as a distributed coil or a concentrated coil.

The rotary casing 15 includes a cylindrical bottomed casing body 16. The casing body 16 includes a casing bottom part 11 and a casing cylindrical part 25. The casing bottom part 11 and the casing cylindrical part 25 are integrally or separately formed. The casing bottom part 11 is an annular plate-like member that is interposed between the plate-like part 12a of the brake rotor 12 and the hub flange 7. The casing cylindrical part 25 extends from an outer peripheral edge portion of the casing bottom part 11 toward the inboard side in a cylindrical manner.

Figure 4:
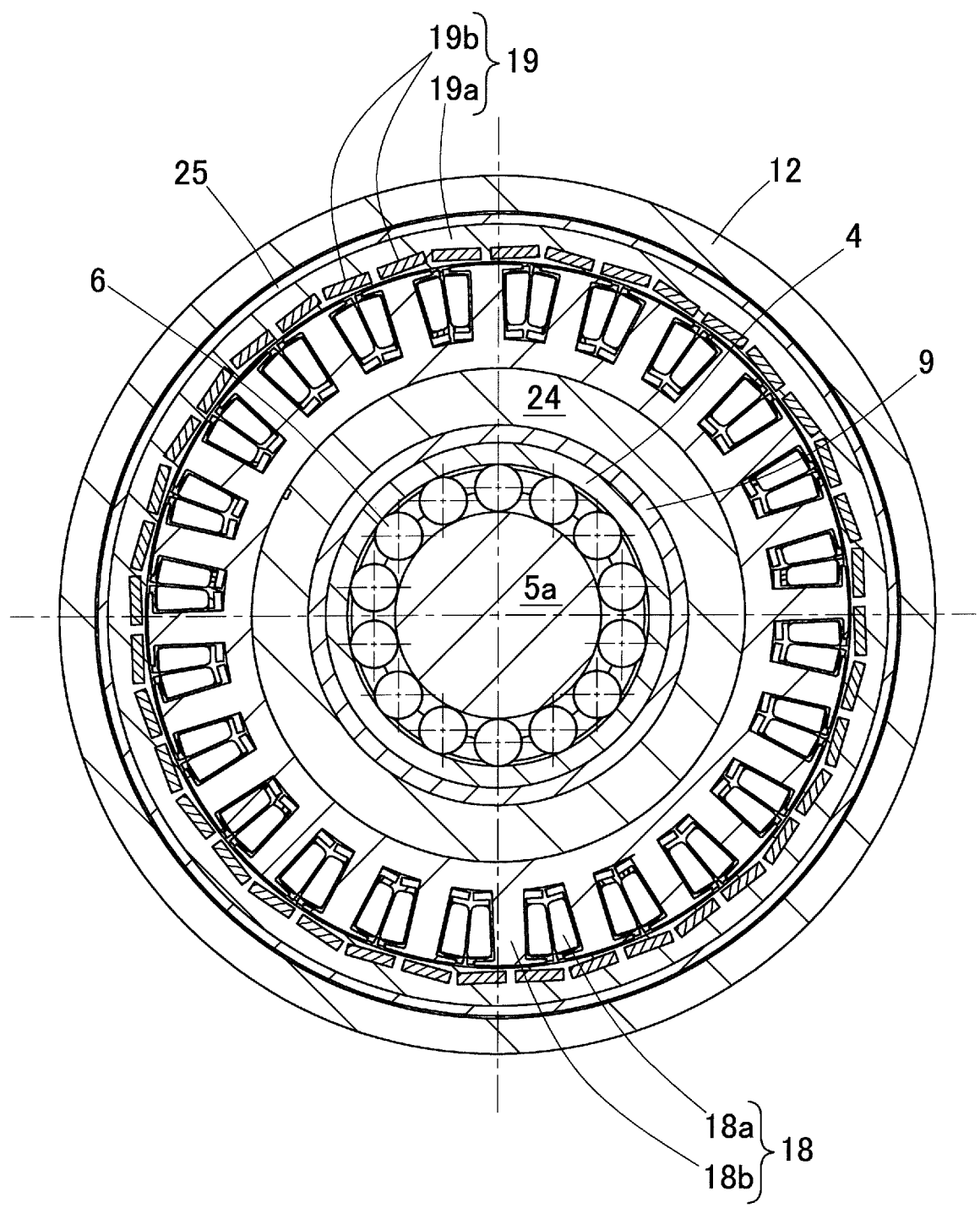
FIG. 4 is a sectional view along line IV-IV in FIG. 1.

The casing cylindrical part 25 has an inner peripheral surface that sequentially forms a small diameter portion, an intermediate diameter portion and a large diameter portion from the outboard side to the inboard side. As shown in FIG. 4, the rotor 19 includes: a magnetic body 19a provided to the intermediate diameter portion of the casing cylindrical part 25 by, e.g., press-fitting; and a plurality of permanent magnets 19b incorporated in the magnetic body 19a. As shown in FIG. 1, an outboard-side end of the rotor 19 is in abutment with a stepped portion of the casing cylindrical part 25, which connects the small diameter portion and the intermediate diameter portion, such that the rotor 19 is axially positioned with respect to the rotary casing 15.

The stator 18 is attached to an outer peripheral surface of the outer ring 4 via an insulating layer 9 and a stator retaining member 24 that is an intermediate member. As shown in FIG. 1 and FIG. 4, the stator 18 includes a core 18a and coils 18b wound around respective teeth of the core 18a. The coils 18b are connected to wiring 17 (FIG. 1).

As shown in FIG. 1, the stator retaining member 24 is in contact with an inner peripheral surface and an outboard-side end face of the stator 18 to retain the stator 18. The stator 18 is fixed to, e.g., the stator retaining member 24 with respect to a rotation direction and a radial direction by press-fitting or bolt fastening. Further, the stator retaining member 24 is fixed to the outer peripheral surface of the outer ring 4 via the insulating layer 9 by press-fitting or the like.

Figure 5:
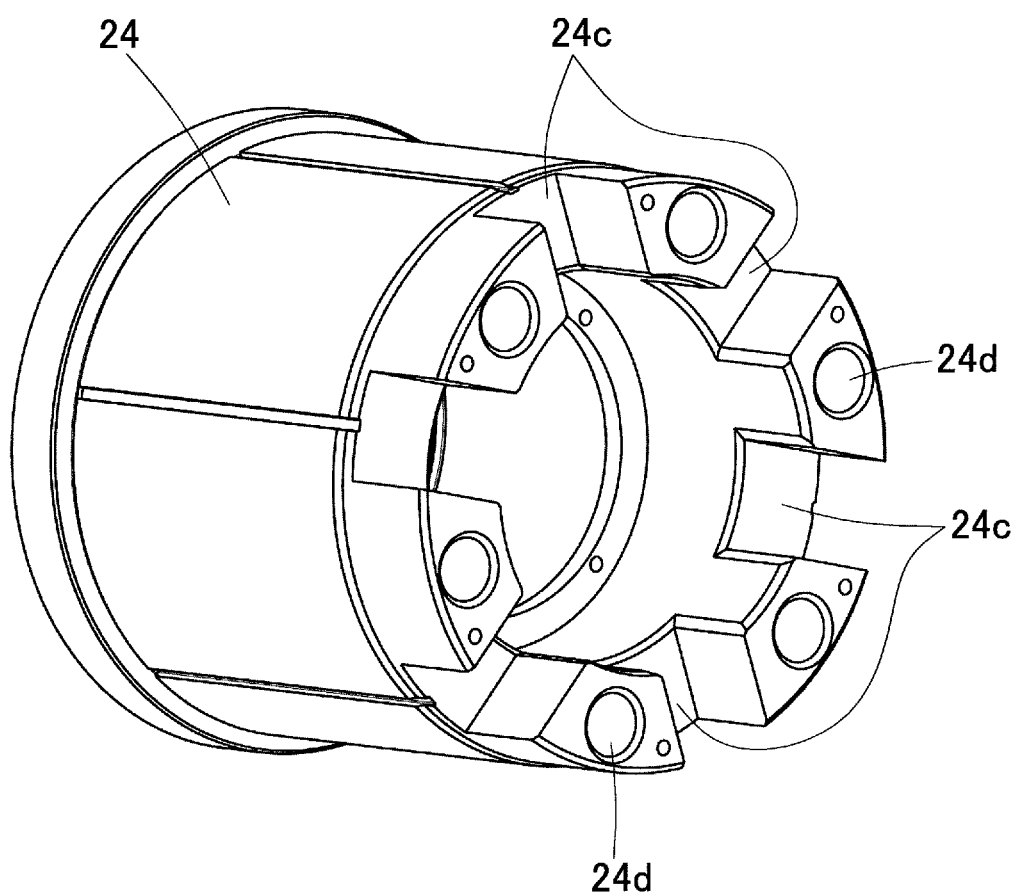
FIG. 5 is a perspective view of an intermediate member of the vehicle power device when viewed from a knuckle surface.

The stator retaining member 24 and the knuckle 8 are fastened with each other by bolts 20. A cover radial wall part 22a of a unit cover 22 is interposed between an inboard-side end face of the stator retaining member 24 and the outboard-side surface of the knuckle 8. As shown in FIG. 5, the stator retaining member 24 that is the intermediate member has an end face on the inboard side (on the side of the knuckle surface) which is provided with a plurality (six, in this example) of communication holes 24c, arranged in a circumferential direction, through which connection wires of the coils 18b (FIG. 1) are passed from the outer diameter side to the inner diameter side of the stator retaining member 24. For example, the plurality of communication holes 24c are defined by providing notches on an end face of the stator retaining member 24 on the inboard side at equal intervals in the circumferential direction. It should be noted that the plurality of communication holes 24c do not necessarily be provided at equal intervals in the circumferential direction and may be defined as communication holes for inserting the wiring 17 (FIG. 1) which generally includes three phases of U phase, V phase, and W phase. As shown in FIG. 1, the knuckle 8 is formed with a through-hole 8*b* that allows the outer peripheral surface of the cylinder part 22*b* of the unit cover 22 to be inserted, and insertion holes (not illustrated) for inserting the plurality of bolts 20 are defined around the through-hole 8*b*.

As shown in FIG. 1 and FIG. 5, the stator retaining member 24 is formed with a plurality of internal threads 24*d* extending in the axial direction at equal intervals in the circumferential direction. The cover radial wall part 22*a* is formed with through-holes (not illustrated) in phase with the respective internal threads 24*d*. The respective bolts 20 are inserted into the insertion holes in the knuckle 8 from the inboard side of the knuckle 8, are passed through the through-holes in the cover radial wall part 22*a* and are screwed into the respective internal threads 24*d* in the stator retaining member 24.

Insulating Layer 9

As shown in FIG. 1, the inner peripheral surface of the stator retaining member 24 is formed with an annular recess 24*a* that is recessed radially outward. The insulating layer 9 that has a cylindrical shape and is made of an insulating material having a desired rigidity is inserted into the annular recess 24*a*. The material of the insulating layer 9 may include, for example, soft materials having insulating properties (such as resin materials and rubber materials) and insulating materials (such as ceramics). It is preferred to use an insulating layer 9 made of a rigid insulating material because a force generated by a vehicle weight and a vehicle movement acts between the stator retaining member 24 that is an intermediate member and the outer ring 4.

The insulating layer 9 has an axial length, i.e., a width dimension, that is substantially the same as the width dimension of the outer peripheral surface of the outer ring 4 and is formed such that all of the outer peripheral surface of the outer ring 4 is covered, and the insulating layer 9 has a radial thickness that is suitably selected in accordance with a driving voltage of the motor generator 3. Such an insulating layer 9 can block current flow to the rolling elements 6 so that electrolytic corrosion of the wheel bearing 2 can be prevented. It should be noted that the insulating layer 9 may be formed on, for example, one or both of the inner peripheral surface of the stator retaining member 24 and the outer peripheral surface of the outer ring 4 by application or thermal spraying of an insulating material.

Sealing Structure

A sealing member 23 for preventing entry of water and extraneous materials into the motor generator 3 and the wheel bearing 2 is disposed between the rotary casing 15 and the outboard-side surface of the knuckle 8. The sealing member 23 includes an annular sealing plate and an elastic sealing member that are opposite to each other. A rotor-end ring member 26 having an annular shape is fixed by bolts to the large diameter portion and the end face of the casing cylindrical part 25 of the rotary casing 15. An axial gap is defined between the rotor-end ring member 26 and the outboard-side surface 8*a* of the knuckle 8.

It should be noted that an annular groove is formed on an outer peripheral surface of the rotor-end ring member 26, and an O-ring is disposed in the annular groove. The O-ring seals a contact surface between an end portion of the inner peripheral surface of the rotary casing 15 and the rotor-end ring member 26. The rotor-end ring member 26 also serves as a positioning member for axially positioning the permanent magnets 19*b* (FIG. 4) incorporated in the magnetic body 19*a* (FIG. 4).

Rotation Detector and the Like

The vehicle power device 1 is provided with a rotation detector 27. The rotation detector 27 is disposed in a hollow inside of the stator 18. The rotation detector 27 detects a rotation angle or a rotation speed of the inner ring 5 with respect to the outer ring 4 in order to control the rotation of the motor generator 3 for travel assisting. The rotation detector 27 includes: a to-be-detected part 27*a* that is attached to a to-be-detected part retaining member 28; and a sensor part 27*b* that is attached to the inner peripheral surface of the stator retaining member 24 and is configured to detect the to-be-detected part 27*a*. For example, the rotation detector 27 may be a resolver. It should be noted that the rotation detector 27 is not limited to a resolver and may be any form, including, e.g., an encoder, a pulsar ring and a hall sensor.

Wiring and the Like

A connector cover 66 for covering an inboard-side end of the cylinder part 22*b* of the unit cover 22 is removably attached to the inboard-side end by a plurality of bolts. The wiring 17 of the motor generator 3 is supported by the connector cover 66 via a so-called panel-mount power wiring connector 67. The connector cover 66 also supports a panel-mount sensor connector 64.

Effects and Advantages

According to the above-described vehicle power device 1, since it is of a direct drive type in which the rotor 19 of the motor generator 3 is mounted to the inner ring 5 that is the rotary ring of the wheel bearing 2, the vehicle power device as a whole can have a smaller number of components and a simple and space-saving configuration, in comparison with the configuration having a speed reduction mechanism or the like, and it is thus possible to suppress increase in the vehicle weight. In a configuration of a conventional example having a speed reduction mechanism, it is not necessary to mount a motor around a wheel bearing, and thus it is possible to provide a configuration in which no potential difference is generated between inner and outer rings of the bearing. Where the stator and the rotor of the motor are disposed between the inner and outer rings of the bearing, a potential difference is generated between the inner and outer rings of the bearing. Therefore, the embodiment of the present invention is limited to the configuration in which a motor generator of a direct drive type is installed in a wheel bearing.

All of the stator 18 and the rotor 19 have a smaller diameter than that of the outer peripheral part 12*b* of the brake rotor 12, and the entirety of the motor generator 3, excluding the mounting part to the hub flange, is located within the axial range L1 between the hub flange 7 and the outboard-side surface 8*a* of the knuckle 8. Therefore, it is possible to secure a space for installing the motor generator 3 inside the brake rotor 12 to compactly accommodate the motor generator 3.

Since an electrolytic corrosion prevention unit having a conventional structure includes a large number of components, it is difficult to secure a space for installing the electrolytic corrosion prevention unit in the vehicle power device that accommodates all the components inside the brake rotor. Such a vehicle power device that accommodates all the components inside the brake rotor especially requires a more compact insulating structure than that of a common in-wheel motor. According to this configuration, it is possible to make use of a small annular space between the outer ring 4 and the stator 18 and interpose the insulating layer 9 in the annular space so that the insulating layer 9 blocks current flow to the rolling elements 6 without increasing the diameter of the vehicle power device 1 as a whole (i.e., without preventing the components of the vehicle power device 1 from being accommodated inside the brake rotor 12).

As a measure against electrolytic corrosion, this configuration provides the following advantages over the configuration in which conducting brushes are used.

(1) Inspection can be easily made to ensure the measure against electrolytic corrosion.

This is because in an assembled state of the vehicle power device, the technique of providing the conducting brushes does not make it possible to check if the conducting brushes conduct current between the inner and outer rings of the bearing, only by measuring electrical resistance between the inner and outer rings of the bearing. In contrast, in the configuration of the present embodiment in which the insulating layer 9 is interposed between the outer ring 4 that is the stationary ring and the stator 18, electrolytic corrosion cannot occur as long as insulation is provided, which is determined by measurement of electrical resistance between the stator 18 and the outer ring 4 or between the stator 18 and the inner ring 5.

(2) The insulating layer 9 does not require replacement because it does not wear like the conducting brushes, which leads to a cost reduction. This is because the insulating layer 9 does not degrade over time during operation, since the insulating layer 9 is not subjected to sliding.

As described above, since the insulating layer 9 is interposed between the outer ring 4 that is the stationary ring and the stator 18 so that the insulating layer 9 blocks current flow to the rolling element 6, it is possible to prevent electrolytic corrosion of the wheel bearing 2. Prevention of electrolytic corrosion of the wheel bearing 2 may make it possible to prevent abnormality in the rolling elements 6 and the rolling surfaces of the wheel bearing 2, extend the service life of the wheel bearing 2, and prevent noise from the wheel bearing 2 in advance. Since the insulating layer 9 does not require replacement because it does not wear like the conducting brushes etc., there is no need to perform maintenance for the insulating function. Therefore, it is possible to reduce costs, in comparison with a conventional example with conducting brushes etc.

Since the motor generator 3 is of an outer rotor type in which the rotor 19 is located radially outside the stator 18, it is possible to increase an area in which the rotor 19 and the stator 18 are opposed to each other, in comparison with that in the motor of inner rotor type. This makes it possible to maximize an output torque in a limited space.

Other Embodiments

In the following description, features corresponding to those described in the above embodiment are denoted with like reference numerals, and overlapping contents will not be described again. Where description is made only to a part of a feature, rest of the feature is the same as that of the embodiment described above, unless specifically indicated otherwise. Like features provide like effects. Combination of parts is not limited to those specifically described in the respective embodiments, and parts of the embodiments can also be combined as long as such a combination does not particularly cause a problem.

Figure 6:
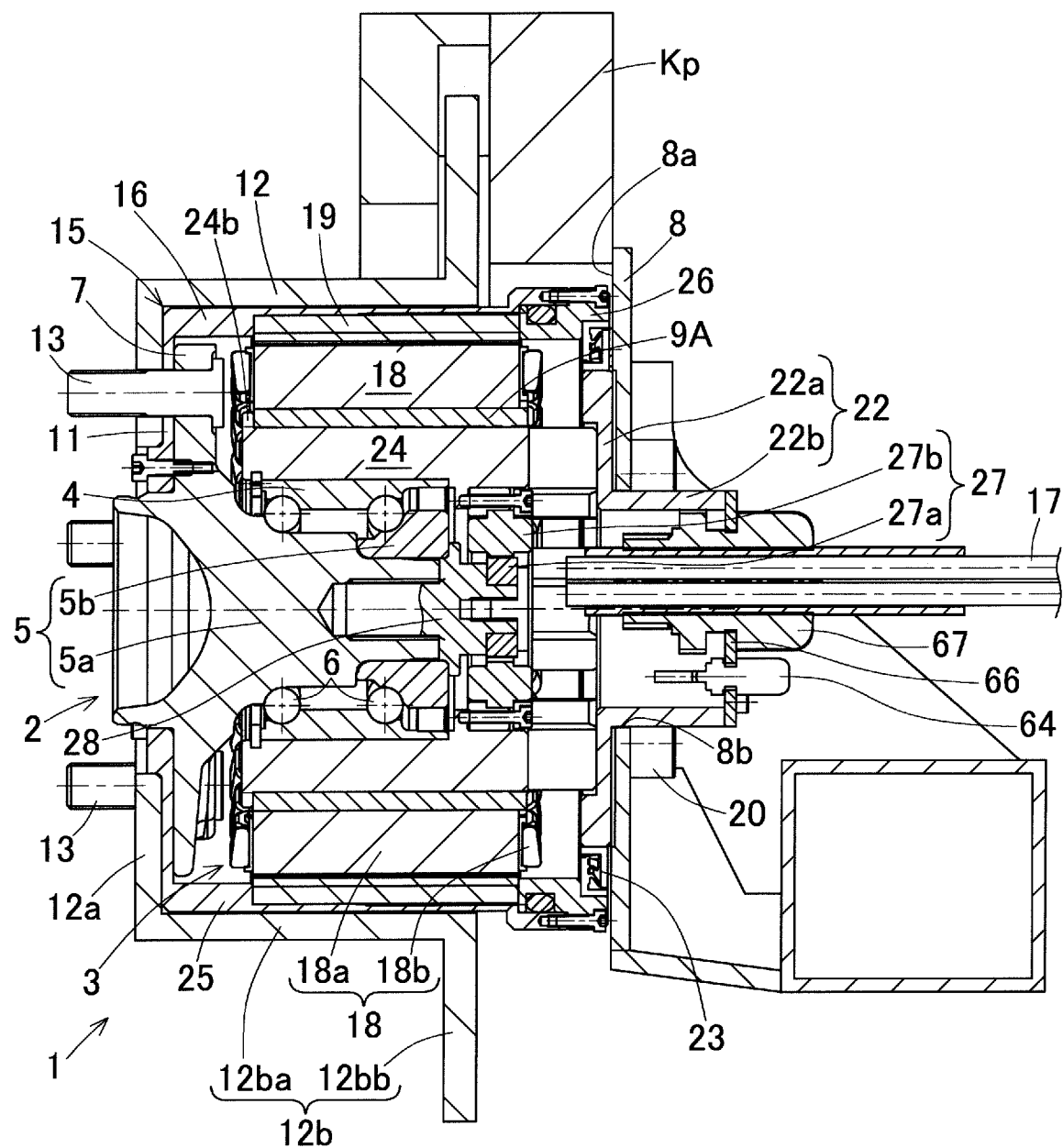
FIG. 6 is a sectional view of a vehicle power device according to another embodiment of the present invention.

As shown in FIG. 6, the vehicle power device 1 may include an insulating layer 9A between the stator retaining member 24 and the stator 18. The insulating layer 9A having a cylindrical shape has an inner peripheral surface fixed to an outer peripheral surface of the stator retaining member 24. A flange part 24b protruding radially outward over a predetermined small distance is formed on the outer peripheral surface of the stator retaining member 24 on the outboard side. An outboard-side end face of the insulating layer 9A is in contact with the flange part 24b so as to be positioned in the axial direction.

The insulating layer 9A has a width dimension that is substantially the same as the width dimension of the stator 18 and is formed such that the insulating layer 9A covers the outer peripheral surface of the stator retaining member 24. The material of the insulating layer 9A may include, for example, soft materials having insulating properties, such as resin materials and rubber materials. The reason is that the insulating layer is not required to have such a high strength because the only force that acts between the stator retaining member 24 and the stator 18 is a force generated by the motor generator 3. According to this configuration, it is possible to reduce costs, in comparison with the above-described configuration in which the insulating materials such as ceramics are used. Otherwise, this configuration provides the same effects and advantages as those of the embodiment described above. It should be noted that the insulating materials such as ceramics may also be used as a material for the insulating layer 9A between the stator retaining member 24 and the stator 18.

Figure 7:
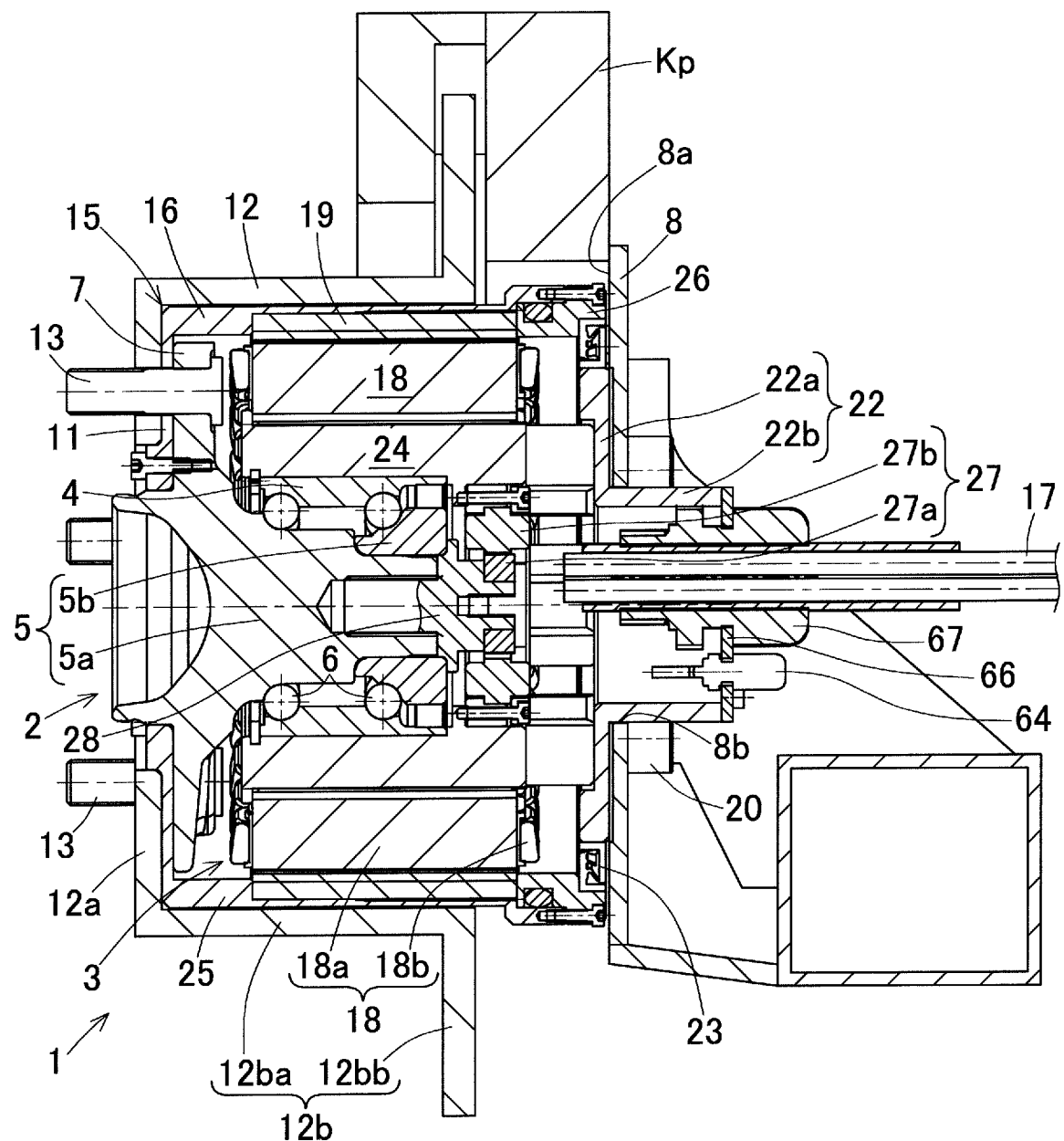
FIG. 7 is a sectional view of a vehicle power device according to yet another embodiment of the present invention.

As shown in FIG. 7, the stator retaining member 24 that is the intermediate member may be made of an insulating material. In such a case, it is possible to reduce the number of components and achieve a simplified configuration, in comparison with the case where a member made of an insulating material is provided in addition to the stator retaining member 24. This makes it possible to achieve a cost reduction. Further, the stator retaining member 24 that is the intermediate member and the outer ring 4 may be integrally formed from the same material, instead of being formed as separate components. In such a case, the inner peripheral surface of the stator 18 is fitted to the outer peripheral surface of the outer ring 4. This configuration makes it possible to impart higher rigidity to the intermediate member and the wheel bearing 2 and to reduce the number of components.

Figure 8:
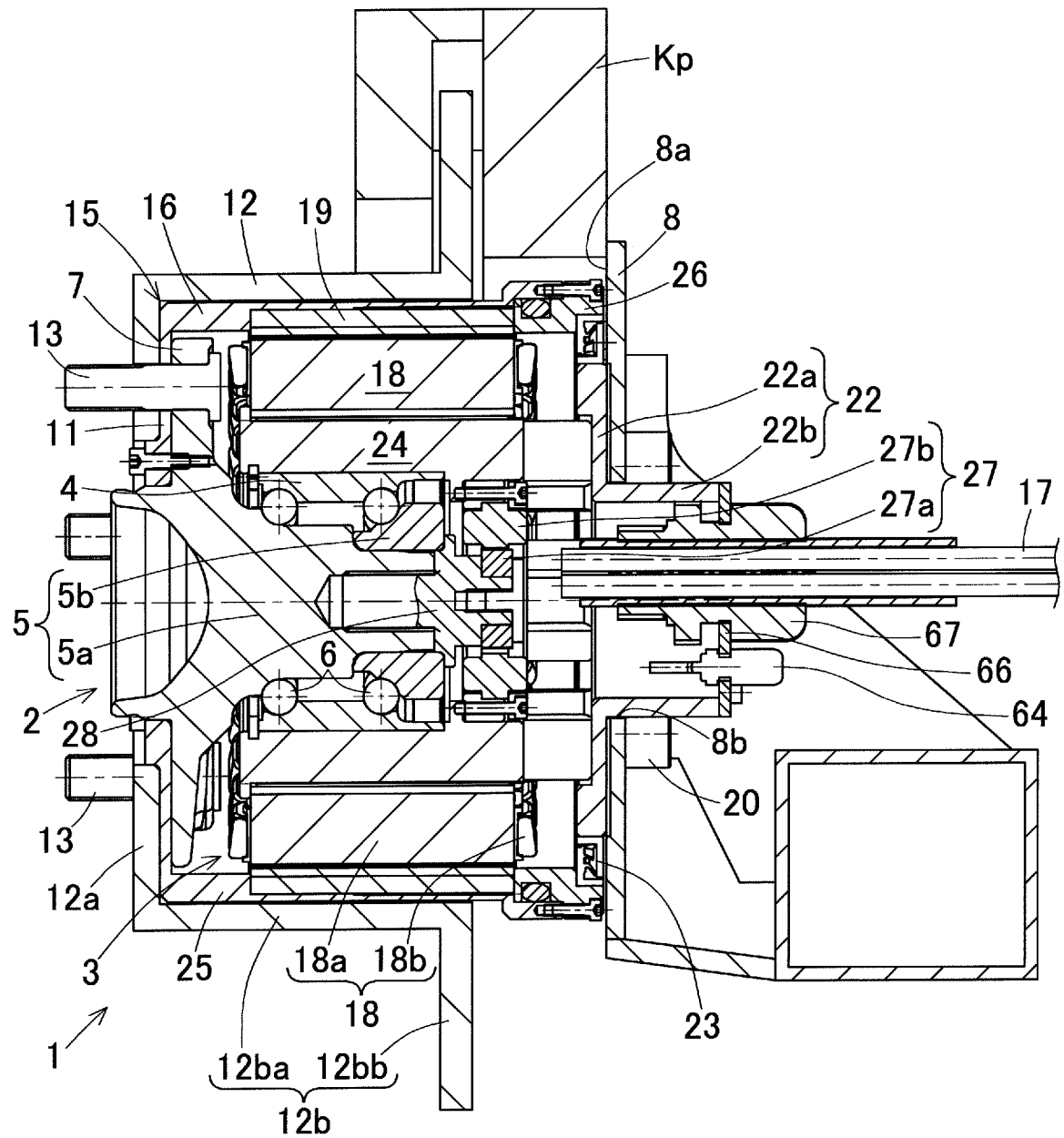
FIG. 8 is a sectional view of a vehicle power device according to yet another embodiment of the present invention.

As shown in FIG. 8, the rolling elements 6 may be made of an insulating material. The insulating material may include ceramics or the like. In such a case, since the rolling elements 6 are made of the insulating material, electrolytic corrosion of the wheel bearing 2 can be prevented by blocking current flow to the rolling elements 6.

Although, in the motor generator 3 of this example, all of the stator 18 and the rotor 19 have a smaller diameter than that of the outer peripheral part 12b of the brake rotor 12, the configuration is not limited to this example. For instance, a part of the stator 18 and the rotor 19 may have a smaller diameter than that of the outer peripheral part 12b of the brake rotor 12. Although not illustrated, the motor generator is of an inner rotor type in which the rotor is located radially inside the stator.

Figure 9:
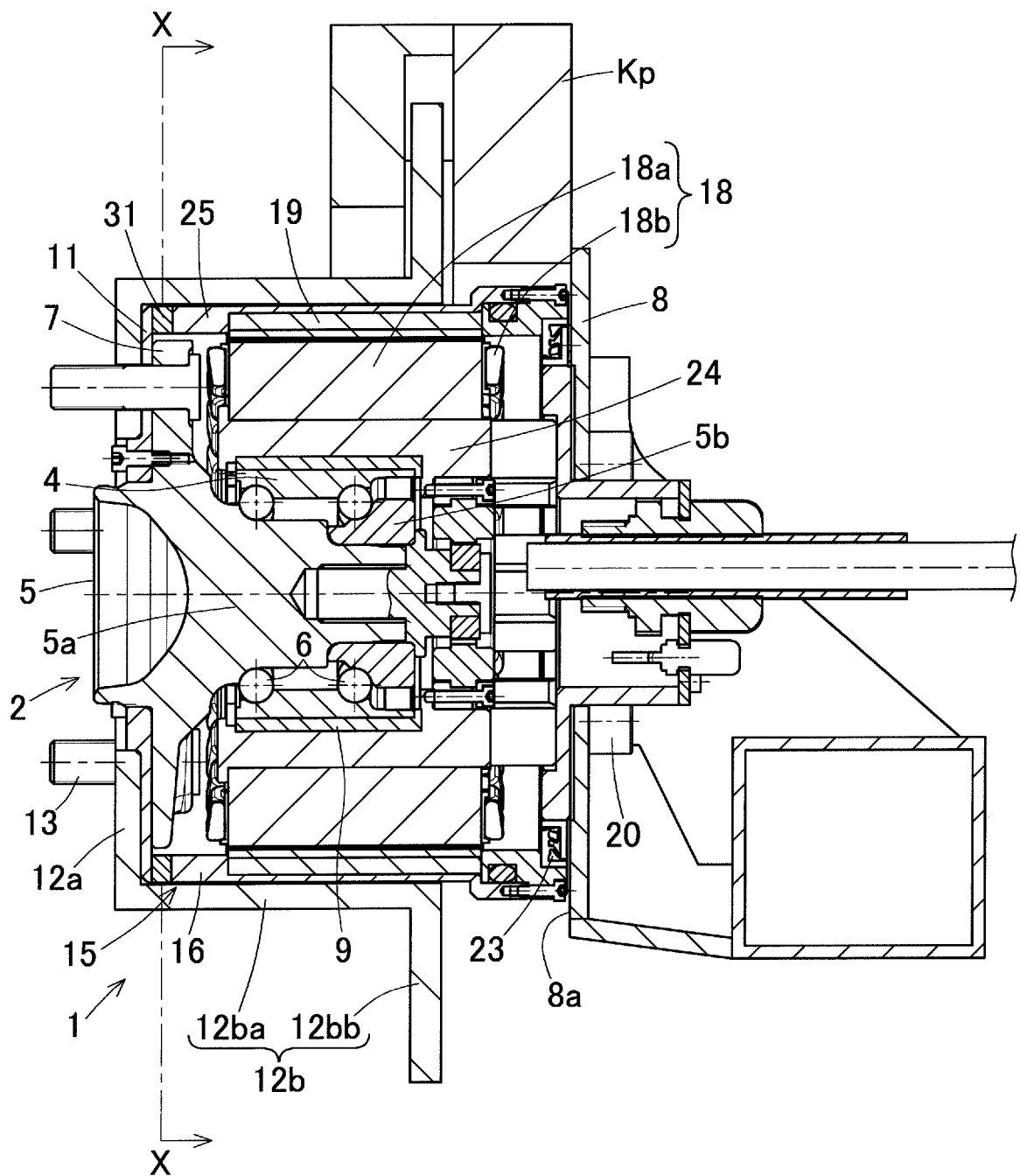
FIG. 9 is a sectional view of a vehicle power device according to yet another embodiment of the present invention.
Figure 10:
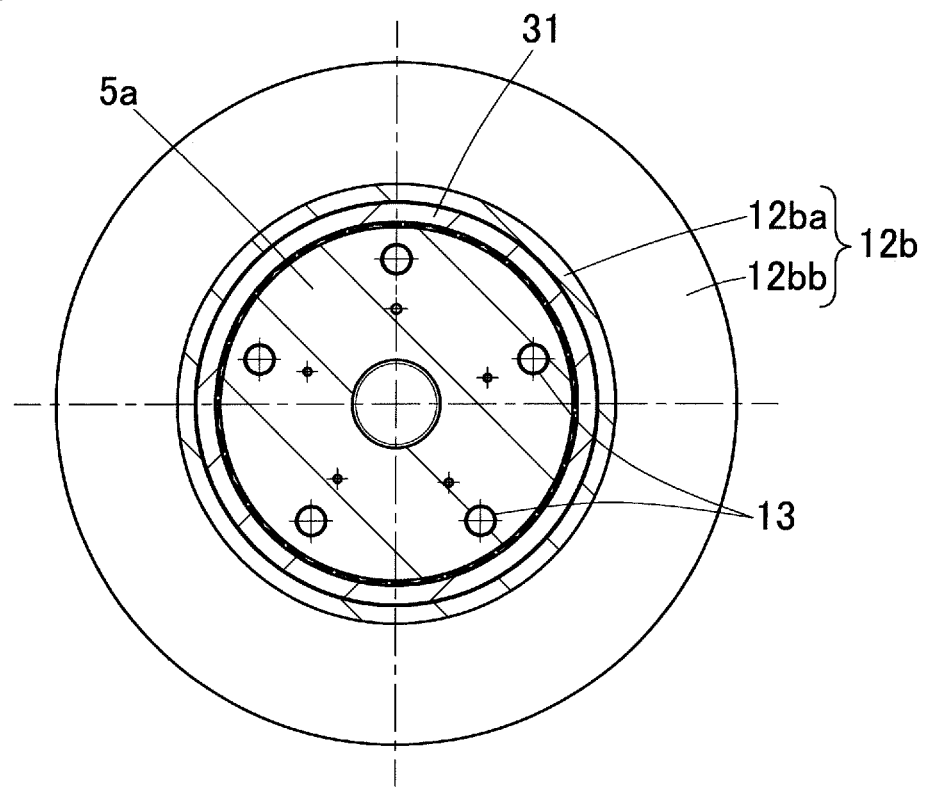
FIG. 10 is a sectional view along line X-X in FIG. 9.
Figure 11:
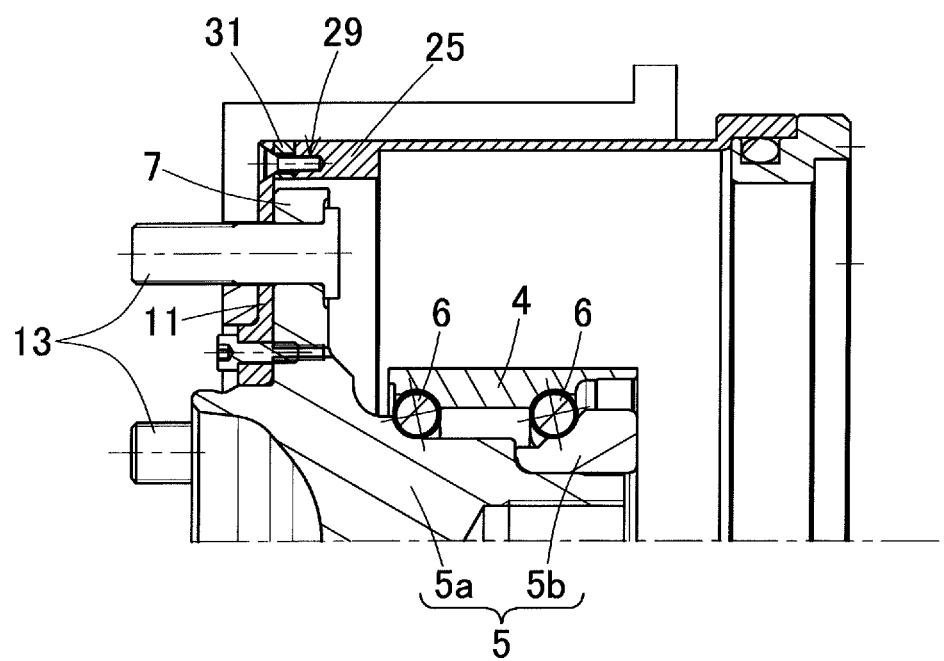
FIG. 11 is a sectional view schematically illustrating a method for fixing an insulating member in the vehicle power device.

As shown in FIG. 9 to FIG. 11, an insulating member 31 may be interposed between the rotor 19 and the inner ring (rotary ring) 5, in addition to the insulating layer 9 interposed between the outer ring 4 and the stator 18 (see FIG. 1). As shown in FIG. 9 and FIG. 10, an insulating member 31 having a ring shape is attached between an outboard-side base end portion of the casing cylindrical part 25 and the casing bottom part 11 of the rotary casing 15. The insulating member 31 is coaxial with the inner ring 5. In the rotary casing 15 of this example, the casing bottom part 11 and the casing cylindrical part 25 are separately formed and are fixed by bolts as described later, with the insulating member 31 interposed therebetween.

As shown in FIG. 11, the outboard-side base end portion of the casing cylindrical part 25 is formed with a plurality of internal threads at predetermined intervals in the circumferential direction, and the insulating member 31 and the casing bottom part 11 are formed with bolt holes and counterbore holes in phase with the plurality of internal threads. Bolts 29 are inserted into the respective bolt holes from the outboard side of the rotary casing 15 and are fastened in the respective internal threads. It is preferred that the insulating member 31 and the bolts 29 are made of a rigid insulating material, such as resin materials and ceramics.

In addition to the above-described possible current flow to the rolling elements 6 due to the potential difference between the inner and outer rings of the bearing, there is a possibility that current may flow from the rotor 19 to the rolling elements 6 through the inner ring 5 due to generation of weak eddy current between the rotor 19 and the stator 18 of the motor generator 3. According to this configuration, the insulating member 31 is provided between the rotor 19 and the inner ring 5, besides the insulating layer 9 interposed between the outer ring 4 and the stator 18, so that insulation is provided between the rotor 19 and the inner ring 5 in order to more reliably prevent electrolytic corrosion of the rolling elements 6.

As a variant of this configuration, although not illustrated, the entire rotary casing 15 may be provided with an insulating material by application or thermal spraying, or the rotary casing 15 may be made of a resin or a ceramic. These variants can provide the same effects as those of the embodiments described above. In this case, the insulating material or the rotary casing 15 made of a resin or a ceramic corresponds to the "insulating member" in this specification. It is also possible to combine the configuration shown in FIG. 9 and the variant in which an insulating material is applied or thermally sprayed to the entire rotary casing 15.

Figure 12:
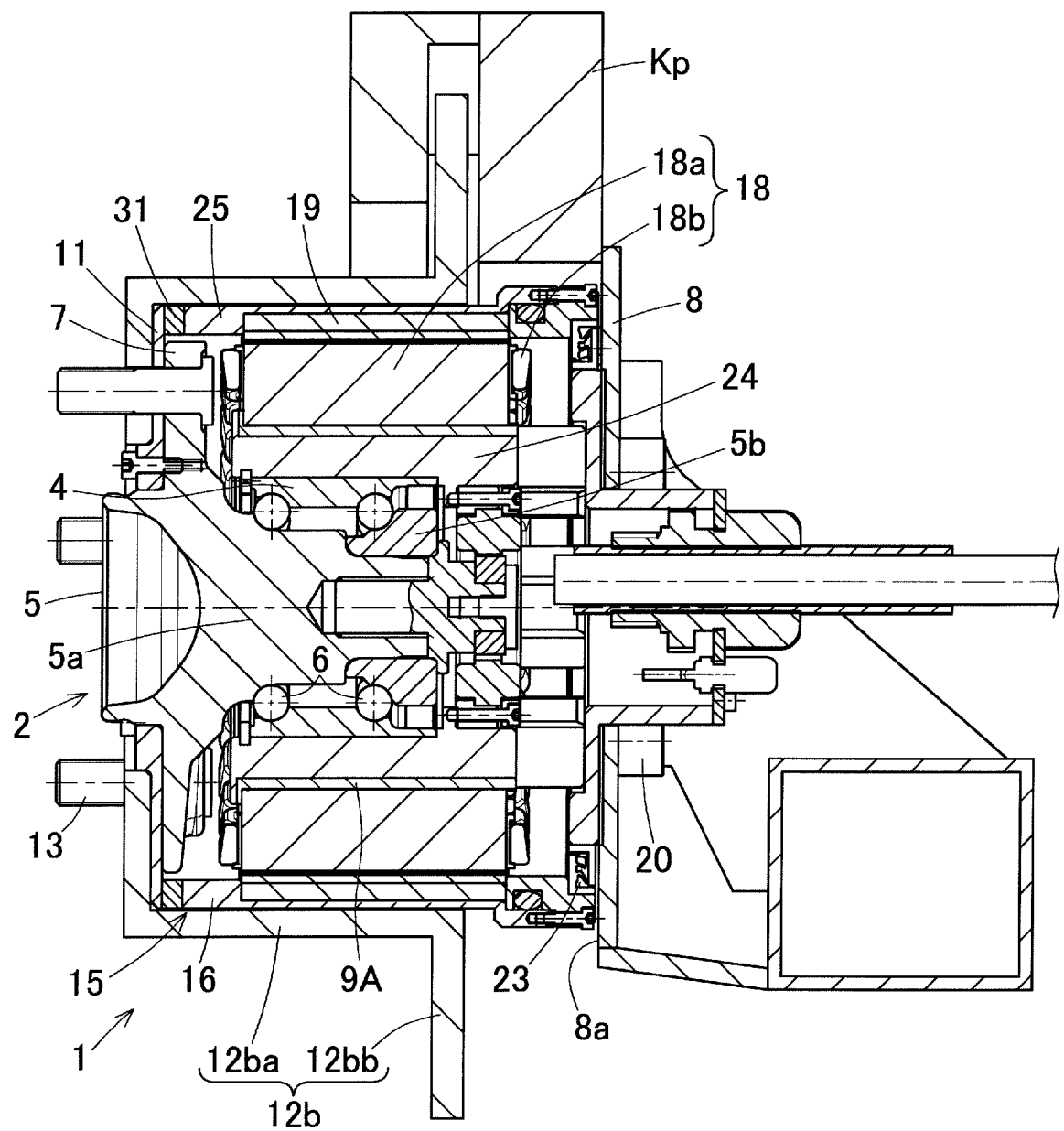
FIG. 12 is a sectional view of a vehicle power device according to yet another embodiment of the present invention.

As shown in FIG. 12, the insulating member 31 may be provided between the rotor 19 and the inner ring 5, in addition to the insulating layer 9A provided between the stator retaining member 24 and the stator 18 (see FIG. 6). Also in the rotary casing 15 of this example, the casing bottom part 11 and the casing cylindrical part 25 are separately formed and are fixed by the bolts, with the insulating member 31 interposed therebetween. According to this configuration, the insulating member 31 is provided between the rotor 19 and the inner ring 5 so that insulation is provided between the rotor 19 and the inner ring 5 in order to more reliably prevent electrolytic corrosion of the rolling elements 6.

Vehicle System

Figure 13:
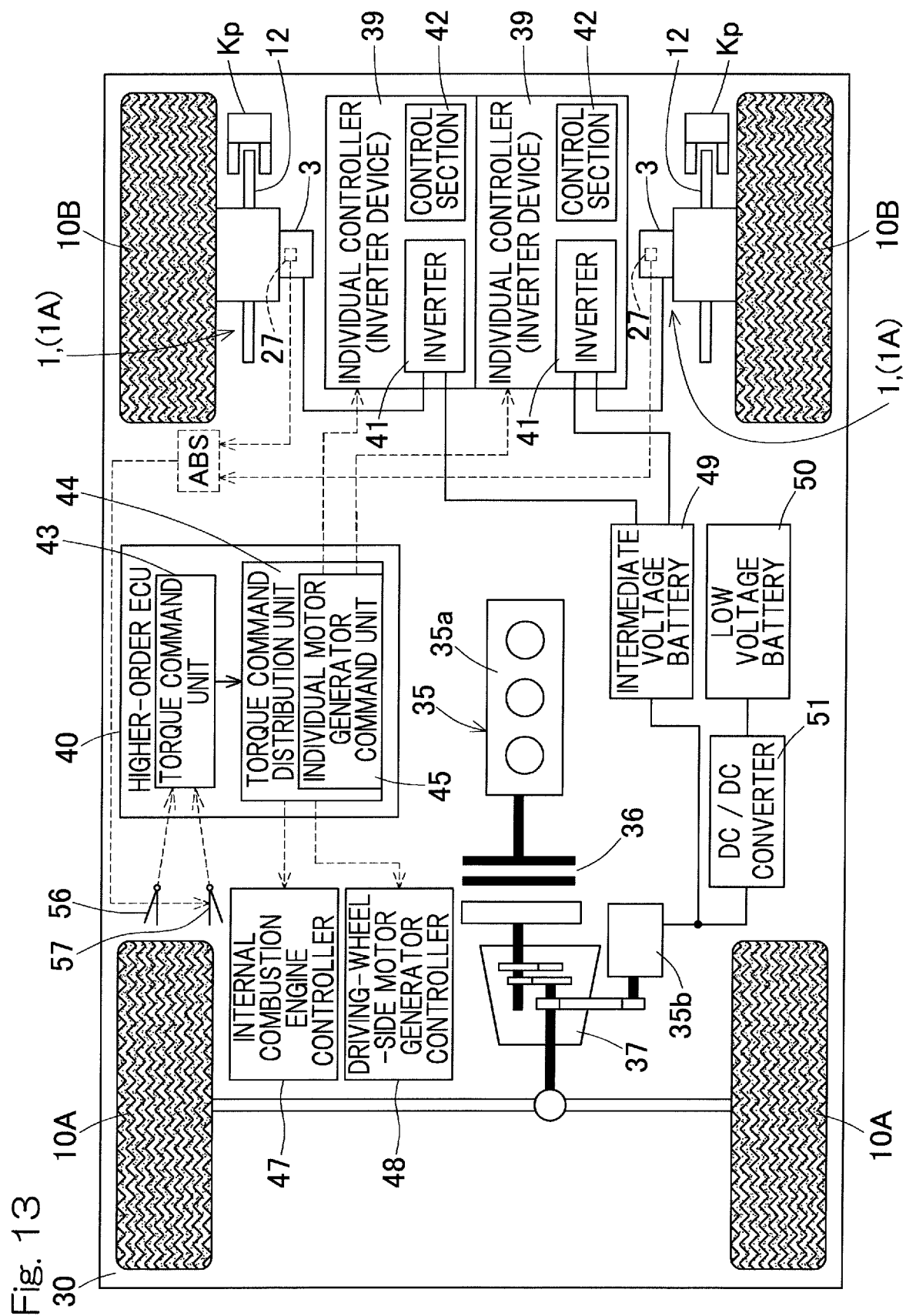
FIG. 13 is a block diagram illustrating a conceptual configuration of a vehicle system of a vehicle equipped with any of the vehicle power devices.

FIG. 13 is a block diagram illustrating a conceptual configuration of a vehicle system including vehicle power devices 1 according to any of the embodiments. In this vehicle system, the vehicle power devices 1 are installed in a vehicle having driven wheels $10_B$ that are not mechanically coupled to a main driving source such that each vehicle power device is mounted to each driven wheel $10_B$. The wheel bearing 2 (FIG. 1, FIG. 6 to FIG. 8, FIG. 9, FIG. 12) of each vehicle power device 1 supports each of the driven wheels $10_B$.

The main driving source 35 is an internal combustion engine (such as a gasoline engine and a diesel engine), or a motor generator (electric motor), or a driving source of a hybrid type in which an internal combustion engine and a motor generator are combined. The term "motor generator" refers to an electric motor capable of generating power by being caused to rotate. In the illustrated example, the vehicle 30 is a hybrid electric vehicle (hereinafter, sometimes referred to as "HEV") of a front-wheel drive type, the vehicle including: front wheels as driving wheels $10_A$; rear wheels as driven wheels $10_B$; and an internal combustion engine 35a and a driving-wheel-side motor generator 35b as main driving sources 35.

Specifically, it is of a mild hybrid type in which the driving-wheel-side motor generator 35b is driven at an intermediate voltage of, e.g., 48V. Hybrid vehicles are generally categorized into strong hybrids and mild hybrids: the mild hybrids refer to hybrid vehicles that have an internal combustion engine as a main driving source and use a motor mainly to assist travelling when they start moving and/or accelerate, and they are distinguished from the strong hybrids in that the mild hybrids can normally travel in an EV (electric vehicle) mode only for a while, but not for a long time. The internal combustion engine 35a in the illustrated example is connected to a drive shaft of the driving wheels $10_A$ via a clutch 36 and a speed reduction gear 37, and the driving-wheel-side motor generator 35b is connected to the speed reduction gear 37.

The vehicle system includes: motors 3 that are generators for travel assisting that rotationally drive the driven wheels $10_B$; individual controllers 39 that control the motors 3; and an individual motor generator command unit 45 that is provided in a higher order ECU 40 and outputs a command for causing the individual controllers 39 to perform control of driving and regeneration. The motors 3 are connected to a power storage unit. The power storage unit may be, e.g., a battery (rechargeable battery) or a capacitor. Although the power storage unit can be any type and be positioned anywhere in the vehicle 30, it corresponds to an intermediate voltage battery 49, of the low voltage battery 50 and intermediate voltage battery 49 mounted in the vehicle 30 in this embodiment.

The motors 3 for the driven wheels are direct drive motors in which no speed reduction gear is used. The motors 3 are supplied with power to operate as motors and also as generators for converting kinetic energy of the vehicle 30 into electric power. Since each motor 3 has a rotor 19 (FIG. 1) attached to an inner ring 5 (FIG. 1), when current is applied to the motor 3 to generate torque in a direction of travel of the vehicle, the inner ring 5 (FIG. 1) is rotationally driven, while when torque is generated in the opposite direction regenerative power is generated. The motor 3 has a drive voltage for rotationally driving or a regenerative voltage of 60 V or lower.

Control System of Vehicle 30

The higher order ECU 40 is a unit for performing integrated control of the vehicle 30 and includes a torque command generation unit 43. The torque command generation unit 43 generates a torque command in accordance with a signal of an operation amount that is input from each of an accelerator operation unit 56 (such as an accelerator pedal) as well as a brake operation unit 57 (such as a brake pedal). The vehicle 30 includes an internal combustion engine 35a and a driving-wheel-side motor generator 35b as main driving sources 35 as well as two motors 3, 3 for driving the two respective driven wheels $10_B$, $10_B$. Accordingly, the higher order ECU 40 is provided with a torque command distribution unit 44 for distributing the torque command(s) to the respective driving sources 35a, 35b, 3, 3 in accordance with a predetermined rule.

A torque command to the internal combustion engine 35a is transmitted to an internal combustion engine controller 47 and is used for, e.g., control of a valve operation degree by the internal combustion engine controller 47. A torque command to the driving-wheel-side motor generator 35b is transmitted to and executed on a driving-wheel-side motor generator controller 48. Torque commands to the generators 3, 3 on the driven wheel side are transmitted to the individual controllers 39, 39. The section of the torque command distribution unit 44 which performs output to the individual controllers 39, 39 is referred to as an individual motor generator command unit 45. The individual motor generator command unit 45 also has a function of providing each individual controller 39 with a torque command that is a command of a distributed braking force to be produced by each motor generator 3 by regenerative braking in response to a signal of an operation amount from the brake operation unit 57.

Each of the individual controllers 39 is an inverter device and includes: an inverter 41 for converting direct current from an intermediate voltage battery 49 into a three-phrase alternating current voltage; and a control section 42 for controlling an output of the inverter 41 in accordance with, e.g., the torque command, by, e.g., PWM control. The inverter 41 includes: a bridge circuit (not illustrated) in the form of, e.g., a semi-conductor switching element.

The control section 42 performs following control for the motor 3 so as to generate a torque corresponding to, for example, a torque command given by the individual motor generator command unit 45. That is, the control section 42 calculates a current to be applied to the motor 3 on the basis of a command torque, a rotation speed detected by the rotation detector 27 (FIG. 1) (which can be easily calculated if a rotation angle sensor is used), and a test result. The control section further calculates a voltage to be applied to the motor 3 on the basis of a calculated current, a rotation angle, and a value from a non-illustrated current sensor. The calculated voltage is applied to the motor 3 so as to generate a torque corresponding to a command torque. It should be noted that although each of the individual controllers 39 is separately provided to each of the two motors 3, 3, the two individual controllers 39, 39 may be disposed in a single enclosure and share the control section 42 in common.

Figure 14:
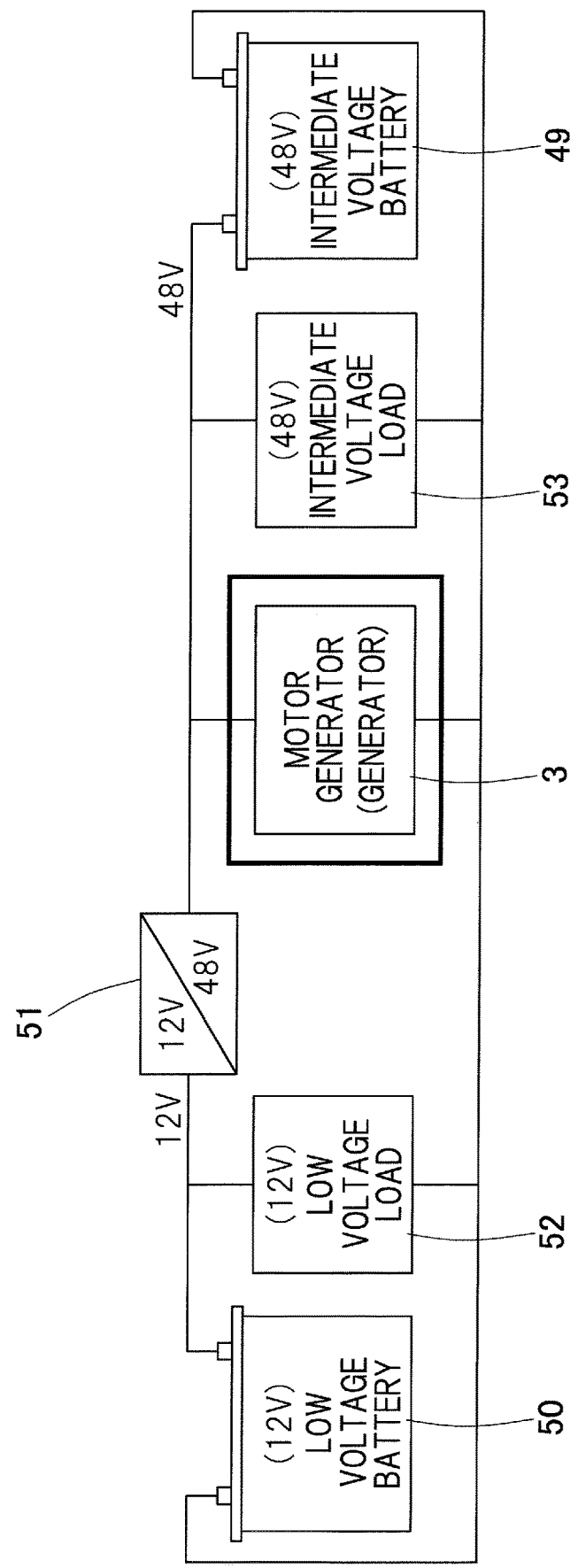
FIG. 14 is a power system diagram of an exemplary vehicle equipped with the vehicle system.
Figure 15:
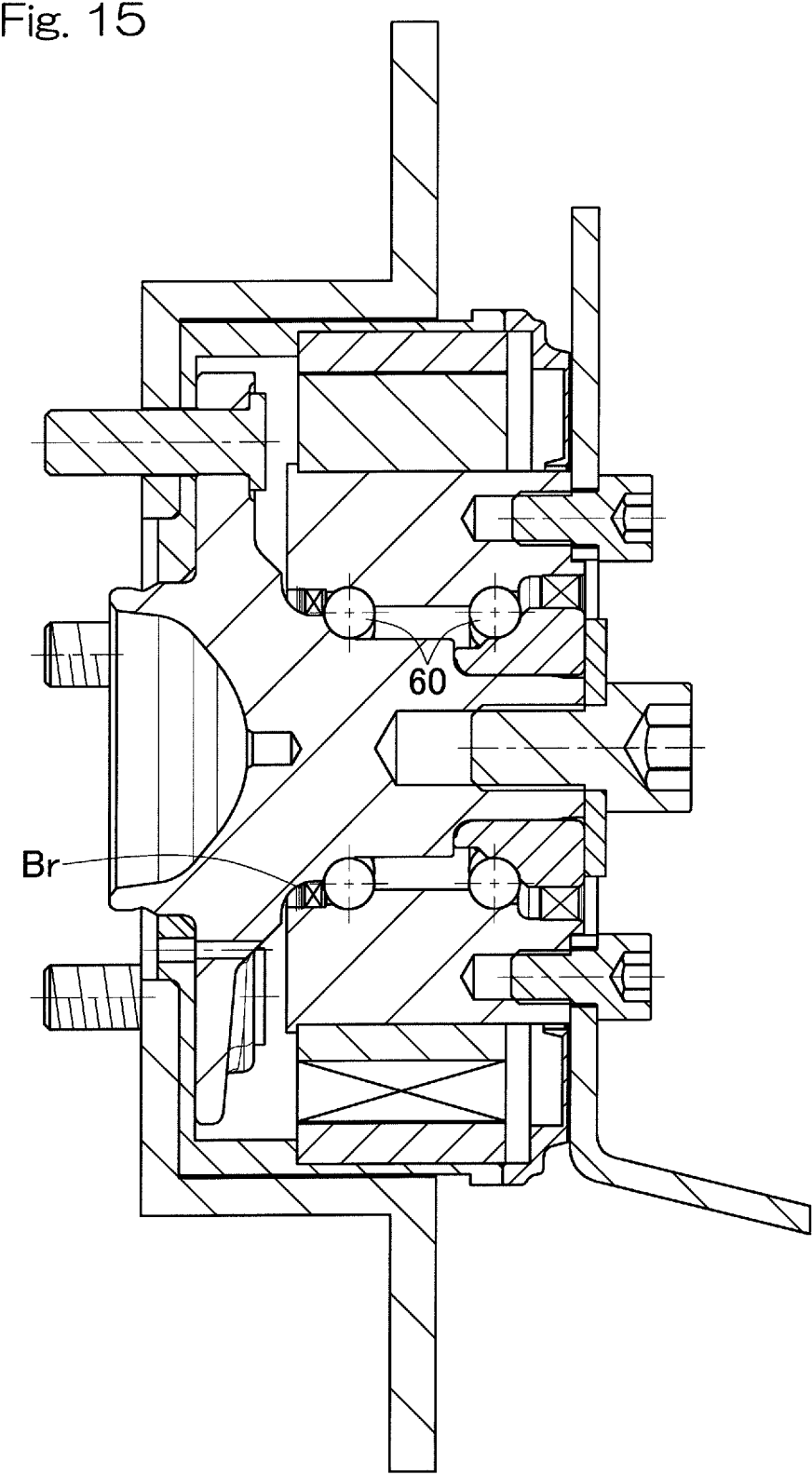
FIG. 15 is a sectional view of a conventional example of a vehicle power device.

FIG. 14 is a power system diagram of an exemplary vehicle equipped with the vehicle system shown in FIG. 13. In the example of FIG. 13, there are a low voltage battery 50 and an intermediate voltage battery 49 as batteries, and the intermediate voltage battery 49 and the low voltage battery 50 are connected via a DC/DC convertor 51. There are two motors 3, but only one of them is illustrated as a representative. Although the driving-wheel-side motor generator 35b in FIG. 13 is not illustrated in FIG. 14, it is connected to the intermediate voltage system in parallel with the motor 3 on the driven wheel side. A low voltage load 52 is connected to the low voltage system, and an intermediate voltage load 53 is connected to the intermediate voltage system. There are a plurality of the low voltage loads 52 and a plurality of the intermediate voltage loads 53, but only one for each load is illustrated as a representative.

The low voltage battery 50 is a battery that is commonly used for various automobiles as a power source for, e.g., a control system, and may be, for example, 12 V or 24 V. The low voltage load 52 may include a starter motor of the internal combustion engine 35a, lights, and key components, such as the higher order ECU 40 and other ECU (not illustrated). The low voltage battery 50 may be called as an auxiliary battery for electric accessories, and the intermediate voltage battery 49 may be called as an auxiliary battery for an electric system.

The intermediate voltage battery 49 has a voltage higher than that of the low voltage battery 50 but lower than that of a high voltage battery (100 V or higher, for example, about 200 to 400 V) used for, e.g., strong hybrid vehicles, the voltage having a negligible influence to a human body when an electric shock occurs during operation. For example, it is preferable to use a 48-V battery that has been employed for mild hybrids in recent years. The intermediate voltage battery 49, such as a 48-V battery, can be relatively easily installed in a vehicle equipped with a conventional internal combustion engine, and such a vehicle can be converted to a mild hybrid so as to reduce fuel consumption by power assistance and/or regeneration by electric power.

The intermediate voltage loads 53 of the 48-V system are the accessory components, including the power-assist motor that is the driving-wheel-side motor generator 35b, an electric pump, an electric power steering, a supercharger, and an air compressor. Since the loads from the accessories are set up as the 48-V system, the system can reduce the possibility of an electric shock to a passenger or a maintenance operator, though the system can provide a lower output by power assistance than that of a high voltage system (such as a strong hybrid vehicle with a voltage of 100 V or higher). The system also allows an insulation coating of a wire to be thin, making it possible to reduce the weight and/or volume of the wires. In addition, the system can input/output a larger electric power with a smaller amount of current than that of a 12-V system, making it possible to reduce the volume of the electric motor or the generator. Thus, the system contributes to the effect of reducing fuel consumption in the vehicle.

This vehicle system is suitable for accessory components of such a mild hybrid vehicle and is applied as a power-assist and power-regenerative component. It should be noted that although conventionally, a mild-hybrid vehicle sometimes includes a CMG, a GMG, or a belt-drive starter motor (none of them are illustrated), all of these are affected by efficiency of a transmission device and a speed reduction gear because they perform power assistance or regeneration for an internal combustion engine or a power device.

In contrast, since the vehicle system of this embodiment is mounted to the driven wheel $10_B$, the vehicle system is separated from the main driving sources, such as the internal combustion engine 35a and the electric motor (not illustrated), and can directly use kinetic energy of the vehicle body in power regeneration. In cases where a CMG, a GMG, or a belt-drive starter motor is provided, its incorporation has to be taken into consideration from a designing phase of the vehicle 30, and thus it is difficult to retrofit these components.

In contrast, the motor 3 of this vehicle system, which can be accommodated inside the driven wheel 10s, can be attached even to a finished vehicle in a number of steps equivalent to that for replacement of a component, making it possible to set up a 48-V system even to a finished vehicle having an internal combustion engine 35a only. An existing vehicle only having an internal combustion engine 35a can be converted to a mild hybrid vehicle by installing a vehicle power device 1 according to any of the above embodiments and the intermediate voltage battery 49 having a drive voltage for rotationally driving the motor or a regenerative voltage of 60 V or lower as a battery for the motor generator, without significant modifications of the vehicle. The vehicle installed with the vehicle system according to this embodiment may be provided with a different motor generator 35b for auxiliary driving, as in the example shown in FIG. 13. In such a case, an amount of power assistance or an amount of regenerative power for the vehicle 30 can be increased, contributing to further reduction in fuel consumption.

Although not illustrated, a vehicle power device according to any of the embodiments may be applied to a driving wheel. It is also possible to apply the vehicle power device to each of the driving wheels and the driven wheels.

Although the vehicle system shown in FIG. 13 has a function of generating power, it may be a system that does not perform rotational drive when supplied with power. This vehicle system includes a wheel bearing device with a generator having a generator 3 that does not serve as a motor and a wheel bearing 2. The wheel bearing device with the generator has the same configuration as that of the vehicle power device according to any of the embodiments, except for the motor generator that also serves as a motor. In this case, regenerative power generated by the generator 3 can be stored in the intermediate voltage battery 49 so that a braking force can be generated. Appropriate use of such a system in combination with or alternative to the mechanical brake operation unit 57 makes it possible to improve braking performance. Thus, when limited to the function of generating power, each individual controller 39 may be in the form of an AC/DC converter device (not illustrated), instead of an inverter device. The AC/DC converter device has a function of converting three-phase alternating current voltage to direct current voltage to charge the intermediate voltage battery 49 with the regenerative power from the generator 3 and can be controlled more easily than an inverter, making it possible to have a compact configuration.

In addition, although the vehicle power device 1 for in the present application has a third generation structure in which the wheel bearing 2 includes a hub axle fitted with the single partial inner ring as the rotary ring and is constituted as an assembly of the outer ring as a stationary ring, the hub axle and the partial inner ring, the configuration of the power device is not limited to this.

A structure body combinedly including a hub having a hub flange and a member having raceway surfaces for rolling elements corresponds to a rotary ring in this specification. The wheel bearing 2 may have, for example, a first generation structure mainly including an outer ring as a stationary ring and an inner ring fitted to an outer peripheral surface of a hub having a hub flange or a second generation structure of an inner ring rotation type including an outer ring as a stationary ring and an inner ring fitted to an outer peripheral surface of a hub having a hub flange. In these examples, a combined body of the hub and the inner ring corresponds to a "rotary ring" in this specification. The wheel bearing 2 may have a second generation structure of an outer ring rotation type including an outer ring as a rotary ring having a hub flange and an inner ring as a stationary ring.

Although the present invention has been described in terms of the embodiments thereof for carrying out the invention, the embodiments disclosed herein are merely examples in all respects, and are not to be taken as limiting the scope of the present invention in any way whatsoever. The scope of the present invention is to be determined by the appended claims, not by the above description, and is intended to include any change made within the scope of claims or equivalent thereto.

REFERENCE NUMERALS

1 . . . Vehicle power device
2 . . . Wheel bearing
3 . . . Motor generator (Motor, Generator)
4 . . . Outer ring (stationary ring)
5 . . . Inner ring (Rotary ring)
7 . . . Hub flange
8 . . . Knuckle (Chassis frame component)
9, 9A . . . Insulating layer
12 . . . Brake rotor
18 . . . Stator
19 . . . Rotor
24 . . . Stator retaining member (intermediate member)
31 . . . Insulating member
Kp . . . Brake caliper

What is claimed is:

1. A vehicle power device comprising:
a wheel bearing including a stationary ring and a rotary ring having a hub flange, the rotary ring being rotatably supported by the stationary ring via rolling elements, the hub flange being configured to be attached with a wheel of a vehicle and a brake rotor; and
a motor including a stator attached to the stationary ring of the wheel bearing and a rotor attached to the rotary ring of the wheel bearing,
wherein all or a part of the stator and the rotor has a smaller diameter than that of an outer peripheral part of the brake rotor, against which a brake caliper is pressed, and an entirety of the motor, excluding a mounting part to the hub flange, is located within an axial range between the hub flange and an outboard-side surface of a chassis frame component of the vehicle,
an insulating layer is interposed between the stationary ring and the stator, and
the vehicle power device comprises an intermediate member between the stationary ring and the stator, the intermediate member being configured to fix the stationary ring to the chassis frame component, wherein the insulating layer is provided one or both of between the intermediate member and the stationary ring and between the intermediate member and the stator.

2. The vehicle power device as claimed in claim 1, wherein the motor is of an outer rotor type in which the stator is located on an outer periphery side of the wheel bearing, and the rotor is located radially outside the stator.

3. The vehicle power device as claimed in claim 1, wherein the motor is a motor generator capable of rotationally driving the wheel.

4. The vehicle power device as claimed in claim 3, wherein the motor has a drive voltage for rotationally driving or a regeneration voltage of 60 V or lower.

5. The vehicle power device as claimed in claim 1, comprising an insulating member between the rotor and the rotary ring.

6. A vehicle power device comprising:
a wheel bearing including a stationary ring and a rotary ring having a hub flange, the rotary ring being rotatably supported by the stationary ring via rolling elements, the hub flange being configured to be attached with a wheel of a vehicle and a brake rotor; and
a motor including a stator attached to the stationary ring of the wheel bearing and a rotor attached to the rotary ring of the wheel bearing,
wherein all or a part of the stator and the rotor has a smaller diameter than that of an outer peripheral part of the brake rotor, against which a brake caliper is pressed, and an entirety of the motor, excluding a mounting part to the hub flange, is located within an axial range between the hub flange and an outboard-side surface of a chassis frame component of the vehicle, an insulating layer is interposed between the stationary ring and the stator, and the vehicle power device comprises an intermediate member between the stationary ring and the stator, the intermediate member being configured to fix the stationary ring to the chassis frame component, wherein the intermediate member is made of an insulating material.

7. A vehicle power device comprising:

a wheel bearing including a stationary ring and a rotary ring having a hub flange, the rotary ring being rotatably supported by the stationary ring via rolling elements, the hub flange being configured to be attached with a wheel of a vehicle and a brake rotor; and a motor including a stator attached to the stationary ring of the wheel bearing and a rotor attached to the rotary ring of the wheel bearing, wherein all or a part of the stator and the rotor has a smaller diameter than that of an outer peripheral part of the brake rotor, against which a brake caliper is pressed, and an entirety of the motor, excluding a mounting part to the hub flange, is located within an axial range between the hub flange and an outboard-side surface of a chassis frame component of the vehicle, the rolling elements are made of an insulating material, and the vehicle power device comprises an intermediate member between the stationary ring and the stator, the intermediate member being configured to fix the stationary ring to the chassis frame component.

8. A wheel bearing device with a generator comprising:

a wheel bearing including a stationary ring and a rotary ring having a hub flange, the rotary ring being rotatably supported by the stationary ring via rolling elements, the hub flange being configured to be attached with a wheel of a vehicle and a brake rotor; and a generator including a stator attached to the stationary ring of the wheel bearing and a rotor attached to the rotary ring of the wheel bearing, wherein all or a part of the stator and the rotor has a smaller diameter than that of an outer peripheral part of the brake rotor, against which a brake caliper is pressed, and an entirety of the generator, excluding a mounting part to the hub flange, is located within an axial range between the hub flange and an outboard-side surface of a chassis frame component of the vehicle, an insulating layer is interposed between the stationary ring and the stator, and the vehicle power device comprises an intermediate member between the stationary ring and the stator, the intermediate member being configured to fix the stationary ring to the chassis frame component, wherein the insulating layer is provided one or both of between the intermediate member and the stationary ring and between the intermediate member and the stator.

9. The wheel bearing device with the generator as claimed in claim 8, comprising an insulating member between the rotor and the rotary ring.

* * * * *